US012713425B2

(12) United States Patent
Dai et al.

(10) Patent No.: US 12,713,425 B2
(45) Date of Patent: Aug. 18, 2026

(54) OVERLAP HANDLING FOR UPLINK CHANNELS WITH MULTI-SLOT TRANSMISSION TIME INTERVAL

(71) Applicant: QUALCOMM INCORPORATED, San Diego, CA (US)

(72) Inventors: Jing Dai, Beijing (CN); Chao Wei, Beijing (CN); Qiaoyu Li, Beijing (CN); Min Huang, Beijing (CN); Changlong Xu, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 224 days.

(21) Appl. No.: 18/253,583

(22) PCT Filed: Jan. 19, 2021

(86) PCT No.: PCT/CN2021/072650

§ 371 (c)(1),
(2) Date: May 18, 2023

(87) PCT Pub. No.: WO2022/155771

PCT Pub. Date: Jul. 28, 2022

(65) Prior Publication Data

US 2024/0008035 A1 Jan. 4, 2024

(51) Int. Cl.
*H04W 72/12* (2023.01)
*H04L 1/1812* (2023.01)
(Continued)

(52) U.S. Cl.
CPC ....... *H04W 72/1268* (2013.01); *H04L 1/1812* (2013.01); *H04W 72/0446* (2013.01); *H04W 72/21* (2023.01)

(58) Field of Classification Search
CPC ......... H04W 72/1268; H04W 72/0446; H04W 72/21; H04L 1/1812; H04L 1/1664; H04L 5/0055; H04L 1/08
See application file for complete search history.

(56) References Cited

U.S. PATENT DOCUMENTS

2014/0056273 A1* 2/2014 Jang ...................... H04L 1/0026 370/329
2019/0261391 A1 8/2019 Kundu et al.
(Continued)

FOREIGN PATENT DOCUMENTS

WO WO-2016117929 A1 * 7/2016 ........... H04L 1/1861
WO WO-2019217827 A1 11/2019
WO WO-2020064458 A1 4/2020

OTHER PUBLICATIONS

International Search Report and Written Opinion—PCT/CN2021/072650—ISA/EPO—Oct. 8, 2021 (2100857WO1).

*Primary Examiner* — Lan-Huong Truong
(74) *Attorney, Agent, or Firm* — Holland & Hart LLP

(57) ABSTRACT

Methods, systems, and devices for wireless communications are described. A user equipment (UE) may convey uplink control information (UCI) to a base station using a multi-slot or single slot uplink channels. In some cases, however, transmissions scheduled on a first set of resources allocated for multi-slot transmission of a first uplink channel may overlap with one or more slots of a second set of resources allocated for multi-slot transmission of a second uplink control channel. Accordingly, the UE may employ a number of different techniques to transmit the UCI. In a first case, the UE may map the UCI to at least one of the overlapping slots of the first uplink channel. In a second case, the UE may drop the second uplink channel which carries the UCI. In a third case, and the UE may map the UCI to an overlapping slot of the second uplink channel.

25 Claims, 22 Drawing Sheets

(51) Int. Cl.

| | |
|---|---|
| ***H04W 72/0446*** | (2023.01) |
| ***H04W 72/1268*** | (2023.01) |
| ***H04W 72/21*** | (2023.01) |

(56) References Cited

U.S. PATENT DOCUMENTS

| | | | | |
|---|---|---|---|---|
| 2020/0252185 | A1 | 8/2020 | Zhang et al. | |
| 2020/0314900 | A1 | 10/2020 | Hosseini et al. | |
| 2021/0153207 | A1* | 5/2021 | Bhamri | H04L 5/0082 |
| 2023/0403702 | A1* | 12/2023 | Su | H04L 1/1896 |
| 2024/0073874 | A1* | 2/2024 | Su | H04L 1/189 |

* cited by examiner

200

400-b

800

1400

Figure 22:
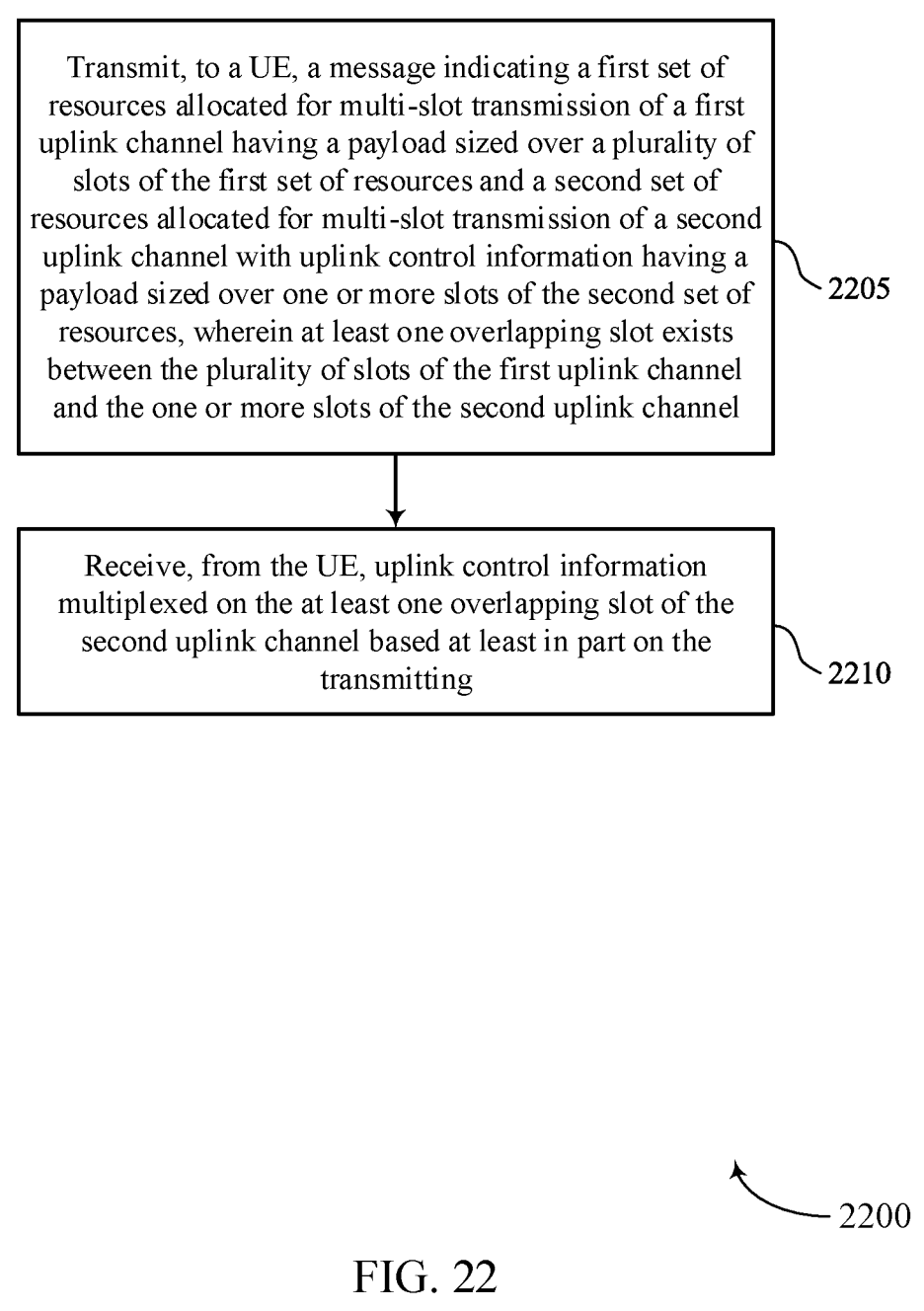

Transmit, to a UE, a message indicating a first set of resources allocated for multi-slot transmission of a first uplink channel having a payload sized over a plurality of slots of the first set of resources and a second set of resources allocated for multi-slot transmission of a second uplink channel with uplink control information having a payload sized over one or more slots of the second set of resources, wherein at least one overlapping slot exists between the plurality of slots of the first uplink channel and the one or more slots of the second uplink channel

2205

Receive, from the UE, uplink control information multiplexed on the at least one overlapping slot of the second uplink channel based at least in part on the transmitting

OVERLAP HANDLING FOR UPLINK CHANNELS WITH MULTI-SLOT TRANSMISSION TIME INTERVAL

CROSS REFERENCE

The present application is a 371 national stage filing of International PCT Application No. PCT/CN2021/072650 by DAI et al. entitled "OVERLAP HANDLING FOR UPLINK CHANNELS WITH MULTI-SLOT TRANSMISSION TIME INTERVAL," filed Jan. 19, 2021, which is assigned to the assignee hereof, and which is expressly incorporated by reference in its entirety herein.

TECHNICAL FIELD

The following relates generally to wireless communications, including overlap handling for uplink channels with multi-slot transmission time interval.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications devices may rely on the exchange of uplink control information (UCI) using allocated uplink resources to efficiently communicate in a wireless communications system. Conventional techniques for transmitting UCI or other uplink channels (e.g., uplink shared channels) in various cases of uplink channel overlap, however, may be deficient.

SUMMARY

The described techniques relate to improved methods, systems, devices, and apparatuses that support overlap handling for uplink channels with multi-slot transmission time interval (TTI). Generally, the described techniques provide support for multi-slot transmissions of uplink shared channels and uplink control channels to increase uplink communications reliability and coverage. A user equipment (UE) may use one or more uplink channels to convey uplink control information (UCI) to a base station, for example, using a multi-slot or single slot uplink control channel or uplink shared channel. In some cases, however, transmissions scheduled on a first set of resources allocated for multi-slot transmission of an uplink shared channel having a payload sized over multiple slots or TTIs may overlap with one or more slots or TTIs of a second set of resources allocated for transmission of an uplink control channel.

To support efficient transmission of the UCI in such cases of uplink channel overlap, the UE may employ a number of different techniques. In a first example where a multi-slot uplink shared channel overlaps with a multi-slot uplink control channel, the UE may map the UCI to at least one of the overlapping slots of the uplink shared channel and transmit the UCI with uplink data using the uplink shared channel. In a second example, the UE may drop the uplink control channel which carries the UCI, and may transmit the uplink shared channel without the UCI. In a third example, a first multi-slot uplink control channel may overlap with a second single slot or multi-slot uplink control channel, and the UE may map the UCI to the overlapping slot to either the first uplink control channel or the second uplink control channel. In some other examples, the UE may receive an additional uplink control channel resource configured via radio resource control (RRC).

A method for wireless communications at a user equipment (UE) is described. The method may include receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources, determining at least one overlapping slot between the set of multiple slots of the uplink shared channel and the one or more slots of the uplink control channel, mapping the UCI of the uplink control channel to the at least one overlapping slot of the uplink shared channel, and transmitting, to a base station, the UCI on the uplink shared channel based on the mapping.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources, determine at least one overlapping slot between the set of multiple slots of the uplink shared channel and the one or more slots of the uplink control channel, map the UCI of the uplink control channel to the at least one overlapping slot of the uplink shared channel, and transmit, to a base station, the UCI on the uplink shared channel based on the mapping.

Another apparatus for wireless communications at a UE is described. The apparatus may include means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources, means for determining at least one overlapping slot between the set of multiple slots of the uplink shared channel and the one or more slots of the uplink control channel, means for mapping the UCI of the uplink control channel to the at least one overlapping slot of the uplink shared channel, and means for transmitting, to a base station, the UCI on the uplink shared channel based on the mapping.

A non-transitory computer-readable medium storing code for wireless communications at a UE is described. The code may include instructions executable by at least one processor to receive a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources, determine at least one overlapping slot between the set of multiple slots of the uplink shared channel and the one or more slots of the uplink control channel, map the UCI of the uplink control channel to the at least one overlapping slot of the uplink shared channel, and transmit, to a base station, the UCI on the uplink shared channel based on the mapping.

Some examples of the method, apparatuses, and non-transitory computer-readable medium described herein may further include operations, features, means, or instructions for multiplexing the UCI with the uplink shared channel on the at least one overlapping slot based on the mapping.

In some examples of the method, apparatuses, and non-transitory computer-readable medium described herein, the first set of resources allocated for multi-slot transmission of the uplink shared channel having a payload sized over one or more transmission block (TB) repetitions that include at least two slots and the method, apparatuses, and non-transitory computer-readable medium may include further operations, features, means, or instructions for mapping the UCI to the at least one overlapping slot, where the at least one overlapping slot includes a first overlapping slot of the one or more TB repetitions.

Some examples of the method, apparatuses, and non-transitory computer-readable medium described herein may further include operations, features, means, or instructions for determining a number of resource elements (REs) occupied by the UCI based on a number of the set of slots of the first set of resources, a number of the one or more slots of the second set of resources, or both.

Some examples of the method, apparatuses, and non-transitory computer-readable medium described herein may further include operations, features, means, or instructions for determining an upper bound for a number of REs occupied by the UCI based on the at least one overlapping slot.

Some examples of the method, apparatuses, and non-transitory computer-readable medium described herein may further include operations, features, means, or instructions for generating a number of encoded bits for a transmission of the UCI on the at least one overlapping slot of the uplink shared channel and rate matching the number of encoded bits to the set of multiple slots of the first set of resources based on a total number the set of multiple slots, a total number of the one or more slots of the second set of resources, and the at least one overlapping slot.

Some examples of the method, apparatuses, and non-transitory computer-readable medium described herein may further include operations, features, means, or instructions for mapping the encoded hybrid automatic repeat request (HARQ) bits to a set of REs adjacent to and after a first set of consecutive demodulation reference signal (DMRS) symbols.

Some examples of the method, apparatuses, and non-transitory computer-readable medium described herein may further include operations, features, means, or instructions for mapping the encoded channel state information (CSI) bits to a first set of symbols that do not carry a DMRS.

In some examples of the method, apparatuses, and non-transitory computer-readable medium described herein, a transmission of the uplink shared channel includes a number of repetitions allocated to the first set of resources.

A method for wireless communications at a UE is described. The method may include receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources, determining at least one overlapping slot between the set of multiple slots for the uplink shared channel and the one or more slots of the uplink control channel, dropping at least a portion of the uplink control channel and UCI associated with the uplink control channel based on the at least one overlapping slot, and transmitting the uplink shared channel in accordance with the dropping of the uplink control channel.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to receive a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources, determine at least one overlapping slot between the set of multiple slots for the uplink shared channel and the one or more slots of the uplink control channel, drop at least a portion of the uplink control channel and UCI associated with the uplink control channel based on the at least one overlapping slot, and transmit the uplink shared channel in accordance with the dropping of the uplink control channel.

Another apparatus for wireless communications at a UE is described. The apparatus may include means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources, means for determining at least one overlapping slot between the set of multiple slots for the uplink shared channel and the one or more slots of the uplink control channel, means for dropping at least a portion of the uplink control channel and UCI associated with the uplink control channel based on the at least one overlapping slot, and means for transmitting the uplink shared channel in accordance with the dropping of the uplink control channel.

A non-transitory computer-readable medium storing code for wireless communications at a UE is described. The code may include instructions executable by at least one processor to receive a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources, determine at least one overlapping slot between the set of multiple slots for the uplink shared channel and the one or more slots of the uplink control channel, drop at least a portion of the uplink control channel and UCI associated with the uplink control channel based on the at least one overlapping slot, and transmit the uplink shared channel in accordance with the dropping of the uplink control channel.

In some examples of the method, apparatuses, and non-transitory computer-readable medium described herein, the UCI includes channel state (CSI) information and the method, apparatuses, and non-transitory computer-readable medium may include further operations, features, means, or instructions for dropping the uplink control channel and the CSI based on the at least one overlapping slot.

In some examples of the method, apparatuses, and non-transitory computer-readable medium described herein, the UCI includes HARQ information and the method, apparatuses, and non-transitory computer-readable medium may include further operations, features, means, or instructions for mapping the HARQ information to the at least one overlapping slot of the set of multiple slots for the uplink shared channel and transmitting the HARQ information based on the mapping.

In some examples of the method, apparatuses, and non-transitory computer-readable medium described herein, the UCI includes one or more scheduling requests and the method, apparatuses, and non-transitory computer-readable medium may include further operations, features, means, or instructions for mapping the one or more scheduling requests to the at least one overlapping slot of the set of multiple slots for the uplink shared channel and transmitting the one or more scheduling requests based on the mapping.

Some examples of the method, apparatuses, and non-transitory computer-readable medium described herein may further include operations, features, means, or instructions for receiving a configuration indicating whether the UE may be to drop the uplink control channel or the uplink shared channel and determining whether to drop the uplink control channel, the uplink shared channel, or both, based on the configuration.

A method for wireless communications at a UE is described. The method may include identifying a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources, determining at least one overlapping slot between the set of multiple slots of the first uplink control channel and the one or more slots of the second uplink control channel, mapping UCI of the second uplink control channel to the at least one overlapping slot of the first uplink control channel, and transmitting, to a base station, the UCI on the first uplink control channel based on the mapping.

An apparatus for wireless communications at a UE is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to identify a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources, determine at least one overlapping slot between the set of multiple slots of the first uplink control channel and the one or more slots of the second uplink control channel, mapping UCI of the second uplink control channel to the at least one overlapping slot of the first uplink control channel, and transmit, to a base station, the UCI on the first uplink control channel based on the mapping.

Another apparatus for wireless communications at a UE is described. The apparatus may include means for identifying a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources, means for determining at least one overlapping slot between the set of multiple slots of the first uplink control channel and the one or more slots of the second uplink control channel, means for mapping UCI of the second uplink control channel to the at least one overlapping slot of the first uplink control channel, and means for transmitting, to a base station, the UCI on the first uplink control channel based on the mapping.

A non-transitory computer-readable medium storing code for wireless communications at a UE is described. The code may include instructions executable by at least one processor to identify a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources, determine at least one overlapping slot between the set of multiple slots of the first uplink control channel and the one or more slots of the second uplink control channel, mapping UCI of the second uplink control channel to the at least one overlapping slot of the first uplink control channel, and transmit, to a base station, the UCI on the first uplink control channel based on the mapping.

Some examples of the method, apparatuses, and non-transitory computer-readable medium described herein may further include operations, features, means, or instructions for multiplexing the UCI with the first uplink control channel on the at least one overlapping slot based on the mapping.

Some examples of the method, apparatuses, and non-transitory computer-readable medium described herein may further include operations, features, means, or instructions for receiving, from the base station, a radio resource control (RRC) message indicating an additional set of resources allocated for transmission of the UCI and mapping the UCI to the additional set of resources based on the RRC message.

In some examples of the method, apparatuses, and non-transitory computer-readable medium described herein, the additional set of resources may be allocated for one or more CSI reports configured based on the RRC message.

In some examples of the method, apparatuses, and non-transitory computer-readable medium described herein, the UCI includes one or more CSI reports and the method, apparatuses, and non-transitory computer-readable medium may include further operations, features, means, or instructions for omitting one or more CSI reports from the mapping based on a number of the one or more slots of the second set of resources.

In some examples of the method, apparatuses, and non-transitory computer-readable medium described herein, the omitting of the one or more CSI reports may be further based on a priority of the one or more CSI reports, a maximum code rate for the UCI, or both.

A method for wireless communications at a base station is described. The method may include transmitting, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel and receiving, from the UE, UCI multiplexed on the at least one overlapping slot of the second uplink channel based on the transmitting.

An apparatus for wireless communications at a base station is described. The apparatus may include at least one processor, memory coupled (e.g., operatively, communicatively, functionally, electronically, or electrically) to the at least one processor, and instructions stored in the memory. The instructions may be executable by the at least one processor to cause the apparatus to transmit, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel and receive, from the UE, UCI multiplexed on the at least one overlapping slot of the second uplink channel based on the transmitting.

Another apparatus for wireless communications at a base station is described. The apparatus may include means for transmitting, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel and means for receiving, from the UE, UCI multiplexed on the at least one overlapping slot of the second uplink channel based on the transmitting.

A non-transitory computer-readable medium storing code for wireless communications at a base station is described. The code may include instructions executable by at least one processor to transmit, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel and receive, from the UE, UCI multiplexed on the at least one overlapping slot of the second uplink channel based on the transmitting.

In some examples of the method, apparatuses, and non-transitory computer-readable medium described herein, the first uplink channel includes an uplink shared channel and the second uplink channel includes an uplink control channel and the method, apparatuses, and non-transitory computer-readable medium may include further operations, features, means, or instructions for receiving, from the UE, the UCI of the uplink shared channel multiplexed on the at least one overlapping slot of the uplink shared channel.

In some examples of the method, apparatuses, and non-transitory computer-readable medium described herein, the first uplink channel includes an uplink shared channel and the second uplink channel includes an uplink control channel and the method, apparatuses, and non-transitory computer-readable medium may include further operations, features, means, or instructions for receiving a multi-slot transmission of the uplink shared channel that may be not multiplexed with the UCI.

In some examples of the method, apparatuses, and non-transitory computer-readable medium described herein, the first uplink channel includes a first uplink control channel and the second uplink channel includes a second uplink control channel and the method, apparatuses, and non-transitory computer-readable medium may include further operations, features, means, or instructions for receiving, from the UE, the UCI of the second uplink control channel multiplexed on the at least one overlapping slot of the first uplink control channel.

In some examples of the method, apparatuses, and non-transitory computer-readable medium described herein, the first uplink channel includes a first uplink control channel and the second uplink channel includes a second uplink control channel and the method, apparatuses, and non-transitory computer-readable medium may include further operations, features, means, or instructions for identifying an additional set of uplink control channel resources for transmission of the UCI, transmitting, to the UE, an RRC message indicating the additional set of uplink control channel resources, and receiving, from the UE, the UCI on the additional set of uplink control channel resources based on the transmitting the RRC message.

BRIEF DESCRIPTION OF THE DRAWINGS

FIGS. 16 through 22 show flowcharts illustrating methods that support overlap handling for uplink channels with multi-slot transmission time interval in accordance with aspects of the present disclosure.

DETAILED DESCRIPTION

Figure 1:
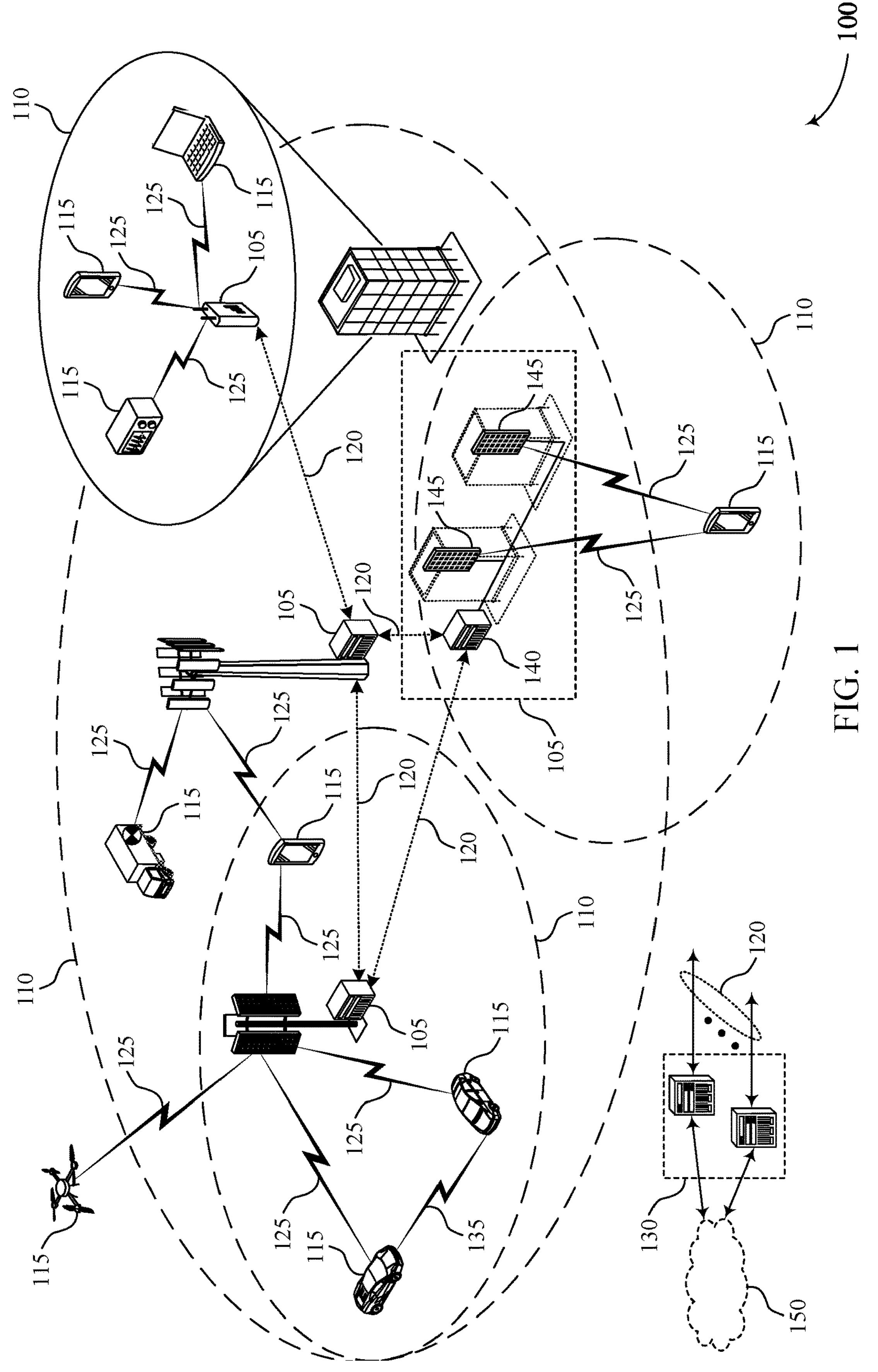
FIG. 1 illustrates an example of a wireless communications system that supports overlap handling for uplink channels with multi-slot transmission time interval in accordance with aspects of the present disclosure.

Some wireless communications systems support multi-slot transmissions of uplink shared channels (e.g., physical uplink shared channels (PUSCH)) and uplink control channels (e.g., physical uplink control channels (PUCCH)) to increase transmission reliability and coverage. A user equipment (UE) may convey uplink control information (UCI) to a base station using one or more uplink channels, for example, using a multi-slot or single slot PUCCH, or using a multi-slot PUSCH. The UCI may include information such as scheduling requests (SRs), hybrid automatic repeat request (HARQ) feedback, channel state information (CSI) reporting information, and other information that support efficient communications between devices of the wireless communications network.

In some cases, transmissions scheduled on two uplink channels, where at least one of which is a multi-slot or multi-TTI transmission, may overlap, during a single slot or during multiple slots allocated for the uplink channels. The UE, however, may not support simultaneous transmissions of two uplink channels on a single carrier. To transmit the UCI, the UE may drop a multi-slot PUSCH in order to transmit UCI on the PUCCH upon identifying the overlap of the PUCCH with a multi-slot PUSCH. The dropping of the multi-slot PUSCH, however, may negatively impact uplink throughput and overall network performance while reducing the number of available time-domain resources for the PUSCH, especially for uplink coverage limited scenarios.

The UE may employ a number of different techniques to support transmission of UCI in cases of multi-slot uplink channel overlap. In a first case, a multi-slot PUSCH may overlap with a multi-slot PUCCH, the UE may map the UCI to one of the overlapping slots of the PUSCH, such that the UCI is multiplexed on the overlapping slot of the PUSCH. In such cases, the UE may apply a modified rate matching rule to map the UCI to the PUSCH, which incorporates the number of slots based on which the transmission block (TB) size of the PUSCH is calculated (e.g., M slots), a number of slots based on which the UCI size is calculated (e.g., M' slots) and the number of overlapped slots (e.g., $M_{overlap}$ slots). In a second case, the UE may drop the PUCCH which carries the UCI, and may transmit the PUSCH without the UCI. In some examples, a decision to drop transmission of the PUCCH, the PUSCH, or both, may be configurable by a base station.

In a third case, a multi-slot PUCCH may overlap with another single slot or multi-slot PUCCH, and the UE may map the UCI to one of the PUCCH resources such that the UCI is multiplexed on the overlapping slot of the two PUCCH resources. Additionally, or alternatively, the UE may receive an additional PUCCH resource configured via an RRC message to transmit the UCI.

Aspects of the subject matter described in this disclosure may be implemented to realize one or more of the following potential advantages. The techniques employed by the described communication devices may provide benefits and enhancements to the operation of the communication devices, including increased reliability for uplink channel communications between the communication devices. For example, operations performed by the described communication devices may provide improvements transmitting UCI in cases where a multi-slot uplink shared channel (or a multi-slot uplink control channel) overlaps with a single or multi-slot uplink control channel. By either multiplexing the UCI on an overlapped slot of the uplink shared channel, an overlapped slot of the uplink control channel, or dropping the UCI or using additional uplink control channel resources, the communication devices may increase coverage and communications reliability, among other benefits.

Aspects of the disclosure are initially described in the context of wireless communications systems. Aspects of the disclosure are further illustrated by and described with reference to apparatus diagrams, system diagrams, UCI multiplexing schemes, process flows, and flowcharts that relate to overlap handling for uplink channels with multi-slot transmission time interval.

FIG. 1 illustrates an example of a wireless communications system 100 that supports overlap handling for uplink channels with multi-slot transmission time interval in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term “carrier” may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a “system bandwidth” of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements (REs) that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), or mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel status information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems support multi-slot transmissions of uplink shared channels and uplink control channels to increase uplink communications reliability and coverage. A user equipment UE 115 may use one or more uplink channels to convey UCI to a base station 105, for example, using a multi-slot or single slot PUCCH, or using a multi-slot PUSCH. In some cases, transmissions scheduled on two multi-slot uplink channels may overlap during a single slot or during multiple slots allocated for the uplink channels, and the UE 115 may not be configured to transmit two uplink channels on a single carrier.

To support efficient transmission of the UCI in such cases of uplink channel overlap, the UE 115 may employ a number of different techniques. In a first example where a multi-slot PUSCH may overlap with a multi-slot PUCCH the UE 115 may map the UCI to one of the overlapping slots of the PUSCH, such that the UCI is multiplexed and transmitted on the overlapping slot of the PUSCH. In a second example, the UE 115 may drop the PUCCH which carries the UCI, and may transmit the PUSCH without the UCI. In some examples, a decision to drop transmission of the PUCCH, the PUSCH, or both, may be configurable by a base station 105. In a third example, a multi-slot PUCCH may overlap with another single slot or multi-slot PUCCH, and the UE 115 may map the UCI to the overlapping slot of one of the PUCCH resources. In some other examples, the UE 115 may receive an additional PUCCH resource configured via an RRC message from the base station 105 to transmit the UCI.

Figure 2:
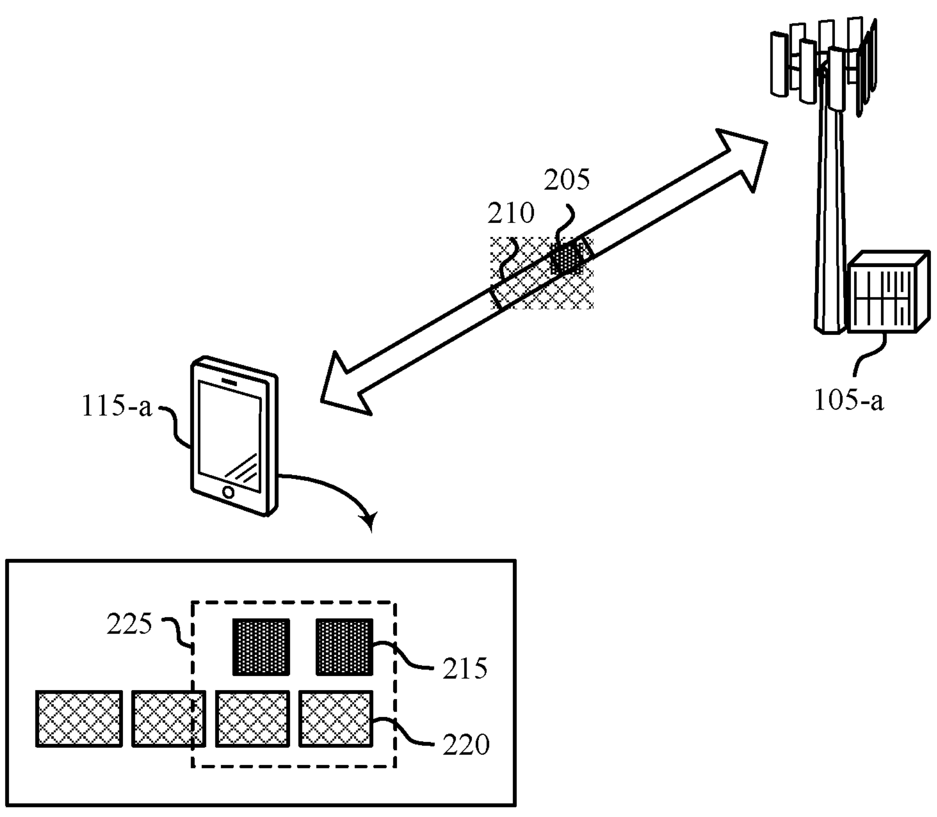
FIG. 2 illustrates an example of a wireless communications system that supports overlap handling for uplink channels with multi-slot transmission time interval in accordance with aspects of the present disclosure.

FIG. 2 illustrates an example of a wireless communications system 200 that supports overlap handling for uplink channels with multi-slot transmission time interval in accordance with aspects of the present disclosure. For example, wireless communications system 200 may include a base station 105-*a* and a UE 115-*a*, which may be examples of corresponding devices (e.g., base station 105 and UE 115) described with reference to FIG. 1.

The base station 105-*a* may communicate with the UE 115-*a* via uplink and downlink signaling over a radio frame. For example, the bae station 105-*a* may transmit wireless channel resource allocation information to the UE 115-*a* which schedules a number of uplink channel resources (e.g., PUSCH resources, PUCCH resources, or both) that the UE 115-*a* may use to transmit control information such as UCI 205 to the base station 105-*a*. In some examples, the UCI 205 may include one or more SRs, HARQ feedback, CSI reporting information (e.g., channel quality indicator (CQI), pre-coding matrix indicator (PMI), CSI resource indicator (CRI) and rank indicator (RI) and/or beam related information such as Layer 1 reference signal received power (L1-RSRP)).

In some cases, the UE 115-*a* may transmit UCI 205 on an uplink control channel (e.g., a PUCCH) using a number of different uplink control channel formats. For example, the wireless communications system 200 may support various different PUCCH formats (e.g., five PUCCH formats) applicable for different payload sizes of the UCI 205, and each format being configured for different symbol lengths. For example, the UE 115-*a* may use one or more short PUCCH formats for the transmission of UCI 205 (e.g., PUCCH formats 0 and 2), which may span 1 or 2 OFDM symbols. PUCCH format 0 may support a payload size of up to two bits, and up to one physical resource block (PRB). PUCCH format 2 format may support a payload size of more than two bits, and up to 16 PRBs. Additionally, or alternatively, the UE 115-*a* may use one or more long PUCCHs (PUCCH formats 1, 3, and 4) for the transmission of the UCI, which may span 4 to 14 OFDM symbols within a slot. PUCCH format 1 may support a payload size of less than or equal to two bits, and up to one PRB. PUCCH format 3 may support a payload size of greater than two bits, and up to sixteen PRBs (excluding PRBs 7, 11, 13, and 14). In addition, PUCCH format 4 may support a payload size of greater than two bits, and up to one PRB. In some examples, for efficient resource utilization, various PUCCH formats may be multiplexed (e.g., TDM) in the same slot.

In some examples, long PUCCH formats (e.g., PUCCH formats 1, 3, and 4) may be include multiple slots allowing for PUCCH repetition over multiple slots (e.g., 2, 4, 8 slots) to further enhance the coverage and transmission reliability (for example, in uplink coverage-limited scenarios). Similarly, the wireless communication system 200 may support repeated transmissions of PUSCH over successive slots (e.g., slot-repetition/-aggregation, or multi-slot PUSCH) to further increase transmission reliability and signal-to-noise ratio (SNR) for uplink transmissions.

In cases of PUSCH repetition (e.g., multi-slot PUSCH), the base station 105-*a* may transmit a scheduling downlink control information (DCI) to the UE 115-*a* which indicates a modulation and coding scheme (MCS) and resource allocation for the PUSCH which are common over the successive slots allocated for the PUSCH repetition. Further, for each slot of the multi-slot PUSCH, the transmission block (TB) may be the same for each repetition, but the encoded bits may differ (e.g., the redundancy version (RV) of each slot may be different). For example, an RV of a first slot may be indicated in the scheduling DCI, while the RV of the $n^{th}$ slot is determined by a modular operation (e.g., 'n mod 4'). For example, for a transmission (newTx) of a 4-slot PDSCH, generally the RV over the four slots may be {RV0, RV2, RV3, RV1}. For a retransmission (reTx) of a 4-slot PDSCH, the RV over the four slots may be {RV2, RV3, RV1, RV0}.

Similar to applying a PUSCH over multiple slots (e.g., a PUSCH with multi-slot TTI), in some cases, the UE 115-*a* may apply a PUCCH over multiple slots to enhance coverage and reliability of transmissions of the UCI and other control information (e.g., UCI may be sized over or allocated to a PUCCH resource in multiple slots).

In some cases, however, two uplink channels 215 and 220 may overlap at 225 in a single carrier (e.g., due to a scheduling conflict or other interference), which may detrimentally affect the low peak-to-average power ratio characteristic of the carrier. Thus, the UE 115-*a* may employ a number of different techniques to transmit UCI 205 in cases where a channel overlap occurs. In some cases, two single slot uplink channels may overlap (e.g., two PUCCHs), and the UCI 205 may be multiplexed on one of the PUCCHs, or the UCI may be multiplexed on a configured PUCCH resource dedicated for multiple CSI reports. In some other examples, the UE 115-*a* may be configured to drop the lowest priority PUCCH (e.g., the PUCCH carrying CSI), or in the case where multiple CSI reports are present on a PUCCH, at least a portion of the CSI reports may be omitted according to priority in order to satisfy a code rate.

In some other examples, a single-slot PUCCH may overlap with a single-slot PUSCH or a multi-slot PUSCH, and the UCI 205 can be multiplexed on the PUSCH at the slot in which the uplink channels overlap.

In further examples, two multi-slot uplink channels may overlap (e.g., uplink channels 215 and 220). For two overlapping PUCCHs (e.g., in which at least one of the two PUCCHs is a multi-slot PUCCH), the PUCCH with lower priority may be dropped. For example, the UE 115-*a* may determine a priority based on UCI type, where HARQ-ACK is prioritized first, followed by SRs and CSI. In some other cases, the UE 115-*a* may determine priority based on a starting slot of the overlapped PUCCHs (e.g., the PUCCH with an earlier starting slot would have a higher priority). In some other examples where a multi-slot PUCCH overlaps with a single-slot or multi-slot PUSCH, the UE 115-*a* may drop the PUSCH (e.g., the PUSCH has lower priority than PUCCH).

In some cases, however, the dropping of a multi-slot PUSCH may negatively impact uplink throughput and overall network performance, while reducing the number of available time-domain resources for the PUSCH, especially for uplink coverage limited scenarios. The UE 115-*a* may thus implement a number of techniques for handling the transmission of UCI 205 in cases where multi-slot uplink channels (such as multi-slot PUSCH and multi-slot PUCCH) overlap. In a first case, a multi-slot TTI PUSCH may overlap with a multi-slot PUCCH, and the UCI 205 is mapped at least one of the overlapping slots of the PUSCH. For example, the UCI 205 may be multiplexed with a PUSCH 210, and may be transmitted to the base station 105-*a* on PUSCH 210. In such cases, the UE 115-*a* may apply a modified rate matching rule to map the UCI 205 to the PUSCH 210, which incorporates the number of slots based on which the TB size of the PUSCH is calculated (e.g., M slots), a number of slots based on which the UCI size is calculated (e.g., M' slots) and the total number of overlapped slots (e.g., $M_{overlap}$ slots). In a second case, the UE 115-*a* may drop the PUCCH such that the UCI 205 is not multiplexed with the PUSCH 210, and the UE 115-*a* instead sends the PUSCH 210 without UCI 205. In some other cases, a multi-slot TTI PUCCH may overlap with another multi-slot PUCCH, and the UCI 205 is multiplexed on one of the overlapped PUCCH resources, or the UE 115-*a* may receive a new PUCCH resource configured via RRC to transmit the UCI 205 on the different RRC configured resource.

Figures 3A, 3B, 3C:
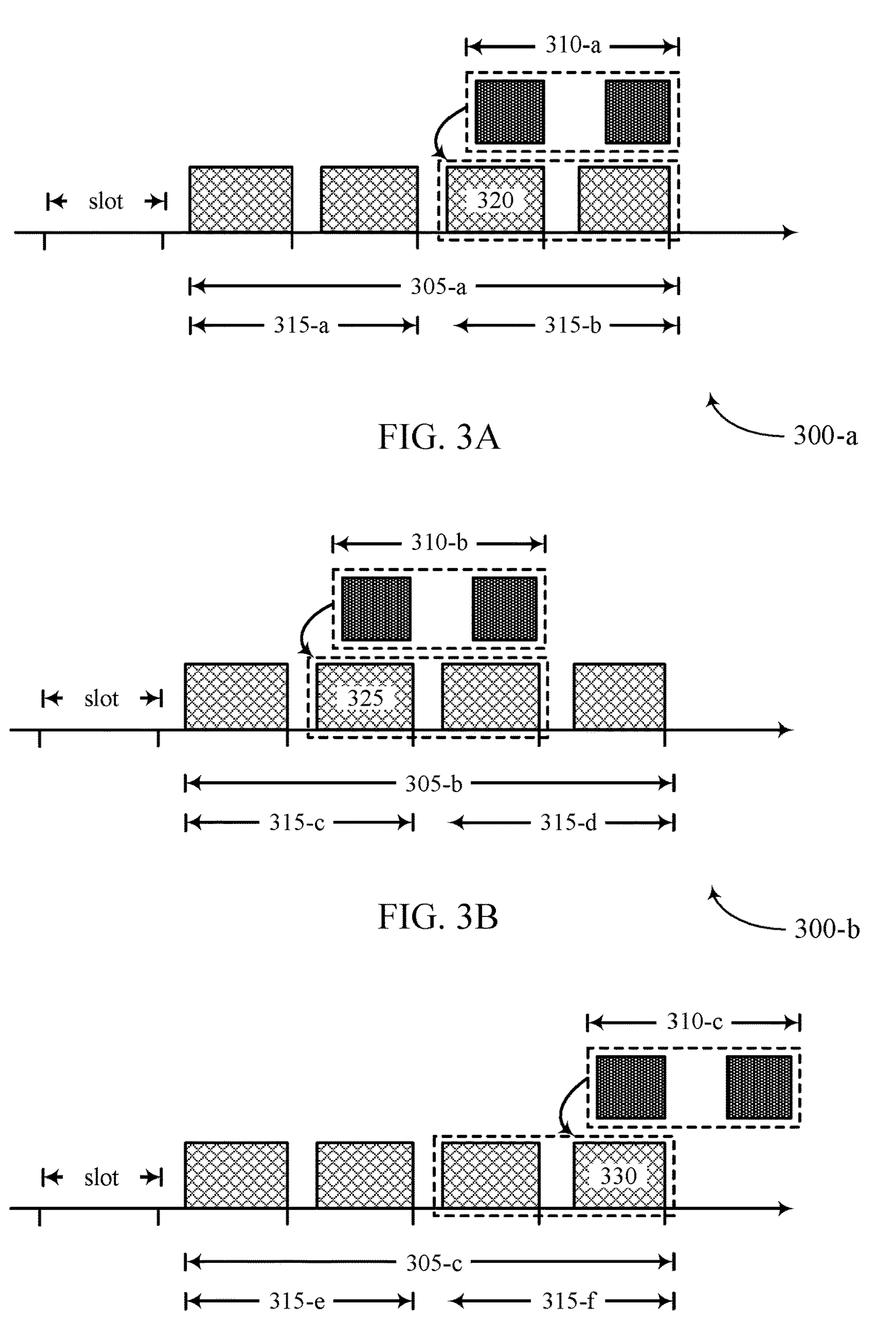
FIGS. 3A, 3B, 3C, 4A, and 4B illustrate example multiplexing schemes for uplink control information (UCI) that support overlap handling for uplink channels with multi-slot transmission time interval in accordance with aspects of the present disclosure.

FIGS. 3A, 3B, and 3C illustrate example multiplexing schemes 300-*a*, 300-*b*, and 300-*c* that support overlap handling for uplink channels with multi-slot transmission time interval in accordance with aspects of the present disclosure. For example, multiplexing schemes 300-*a* 300-*b*, and 300-*c* may be implemented at a UE 115 for communication with a base station 105, which may be examples of corresponding devices described with reference to FIGS. 1 and 2.

In FIGS. 3A, 3B, and 3C, a multi-slot TTI PUSCH may overlap with a multi-slot PUCCH. The multi-slot PUSCH 305 may be associated with a TB occupying more than one slot. The number of slots based on which the size of the TB is calculated may be denoted by the variable M, where M>1 in cases where the PUSCH is multi-slot. In addition, the multi-slot PUCCH 310 may include UCI which is sized over one or more slots (e.g., allocated to or spanning one or more slots), and the number of slots based on which the UCI size is calculated may be denoted as M' (e.g. UCI size may be associated with the resources of a number of M' slots, a modulation order $Q_m$, and a maximum code rate r), where M'>1 in some examples.

In some cases, the TB size of the PUSCH may be determined with PUSCH resources of a single slot, including in cases of multi-slot PUSCH (e.g., PUSCH repetition). For example, the TB size of the multi-slot PUSCH may be determined as $TBS+L_{CRC}N_{RE}\cdot R\cdot Q_m$, where R is a coding rate and $Q_m$ is modulation order indicated by MCS, and $N_{RE}$ is the total number of data REs of PUSCH in a single slot. This can result in a very low overall code rate for a multi-slot PUSCH $R_{overall}$=R/N, where N is the total number of slots for the multi-slot PUSCH.

In FIGS. 3A, 3B, and 3C, for example, the TB size is determined to be two slots such that the 4 slot PUSCH 305 may be separated into two repetitions 315-*a* and 315-*b* of a TB, where the TB is “sized” over M=2 slots (e.g., the TB size may be two slots such that the total number of slots for the PUSCH is 4 slots). It some other cases, the total number of slots occupied by the multi-slot PUSCH and the number of slots of the TB may be different.

In the first example of multiplexing scheme 300-*a*, the PUCCH 310-*a* (e.g., a two-slot PUCCH) may overlap with the multi-slot PUSCH 305-*a* at a second two-slot repetition 315-*b* of the PUSCH 305. In such cases of overlap, a UE may map the UCI of the PUCCH to the first overlapping slot 320 (e.g., the first slot of the second two-slot repetition 315-*b*) such that the UCI is multiplexed on the PUSCH 305.

In the second example of multiplexing scheme 300-*b*, the PUCCH 310-*b* (e.g., a two-slot PUCCH) may overlap with both repetitions 315-*c* and 315-*d* of the multi-slot PUSCH 305-*b*. In such cases, a UE may map the UCI of the PUCCH 310-*b* to a second slot 325 (e.g., the first overlapping slot) of the first repetition 315-*c* of the PUSCH 305-*b*. In such cases of overlap, a UE may map the UCI of the PUCCH to the overlapping slot 325 such that the UCI is multiplexed on the PUSCH 305.

In the third example of multiplexing scheme 300-*c*, the PUCCH 310-*c* (e.g., a two-slot PUCCH) may overlap with repetition 315-*f* of the multi-slot PUSCH 305-*c*. In such cases, a UE may map the UCI of the PUCCH 310-*c* to a second slot 330 (e.g., the first overlapping slot) of the second repetition 315-*c* of the PUSCH 305-*c*. In such cases of overlap, a UE may map the UCI of the PUCCH to the overlapping slot 330 such that the UCI is multiplexed on the PUSCH 305.

In accordance with multiplexing schemes 300-*a*, 300-*b*, and 300-*c*, the UE may apply rate matching to accommodate the mapping of the UCI to overlapped slots. For example, the UE may take into account the number of REs that the UCI may occupy (e.g., determined by M or M'), and an upper bound (e.g., maximum or threshold number) for the number of REs that UCI can be mapped to (determined by $M_{overlap}$, a total number of overlapped slots). In cases where the UCI includes HARQ-ACK feedback information, for example, the UE may apply the following equation for determining the number of REs occupied by the UCI:

$$Q'_{HARQ-ACK} = \min\left(\left\lceil \frac{(O_{HARQ-ACK}+O_{CRC})\cdot M\cdot\beta_{offset}^{HARQ-ACK}}{M'\cdot\sum_{i=0}^{C_{UL-SCH}-1}} \sum_{l=0}^{N_{symb,all}^{PUSCH}-1} M_{sc}^{UCI}(l)\right\rceil, \left\lceil \alpha\cdot M_{overlap}\cdot\sum_{l=l_0}^{N_{symb,all}^{PUSCH}-1} M_{sc}^{UCI}(l)\right\rceil\right)$$

where $$\sum_{l=l_0}^{N_{symb,all}^{PUSCH}-1} M_{sc}^{UCI}(l)$$

is the total number of REs per layer of the PUSCH 305 in one slot that UCI can be mapped to, $$\sum_{i=0}^{C_{UL-SCH}-1} K_i$$

is the payload size of the PUSCH including a size of the TB and a total number cyclic redundancy check (CRC) bits ($C_{UL-SCH}$ is the number of code blocks, and $K_i$ is the code block (CB) size of the $i^{th}$ code block, or $K_i$=0 if the $i^{th}$ code block is not transmitted, for example, in a retransmission), ($O_{HARQ-ACK}+O_{CRC}$) is the number of UCI payload size including CRC bits, and $$\alpha\cdot M_{overlap}\cdot\sum_{l=l_0}^{N_{symb,all}^{PUSCH}-1} M_{sc}^{UCI}(l)$$

may be the upper bound of the number of REs occupied by the UCI. In addition, a portion factor $\alpha\in\{0.5, 0.65, 0.8, 1.0\}$ along with $M_{overlap}$ may be configured to determine an upper bound of REs occupied by the UCI. HARQ-ACK may be one example of UCI, although other types of UCI are possible.

In accordance with the multiplexing schemes 300-*a*, 300-*b*, and 300-*c*, the UE may map encoded HARQ-ACK bits (e.g., as part of the UCI) to REs starting with the a first OFDM symbol (e.g., $l_0$) after the first set of consecutive demodulation reference signal (DMRS) symbols located in the overlapped slots (e.g., slots 320, 325, and 330). In some cases where the UCI includes CSI, encoded CSI bits may be mapped starting with the first OFDM symbol (e.g., symbol 0) that does not carry DMRS located in the overlapped slots (e.g., slots 320, 325, and 330).

In some other cases, for example, in cases where a PUCCH overlaps with a multi-slot PUSCH, the UE may determine to drop the PUCCH, and to not multiplex the UCI on the PUSCH. Instead, the UE may transmit the PUSCH without UCI. In some cases, the UE behavior to drop the PUCCH, to drop the PUSCH, or to multiplex the UCI on the PUSCH, is configurable by a base station or by higher level signaling. For example, in some cases (e.g., when the UCI includes CSI information or lower priority control information), the UE may be configured to drop the PUCCH or the PUSCH. In some other cases, however (e.g., when the UCI includes HARQ-ACK information or SRs), the UE may be configured to drop the PUSCH, or the UE may determine that the UCI is to be multiplexed on the PUSCH.

Figure 4A:
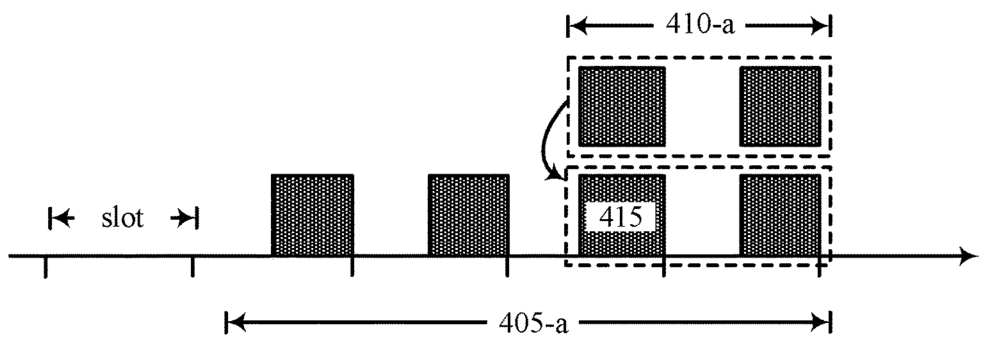
Figure 4A:
Figure 4B:
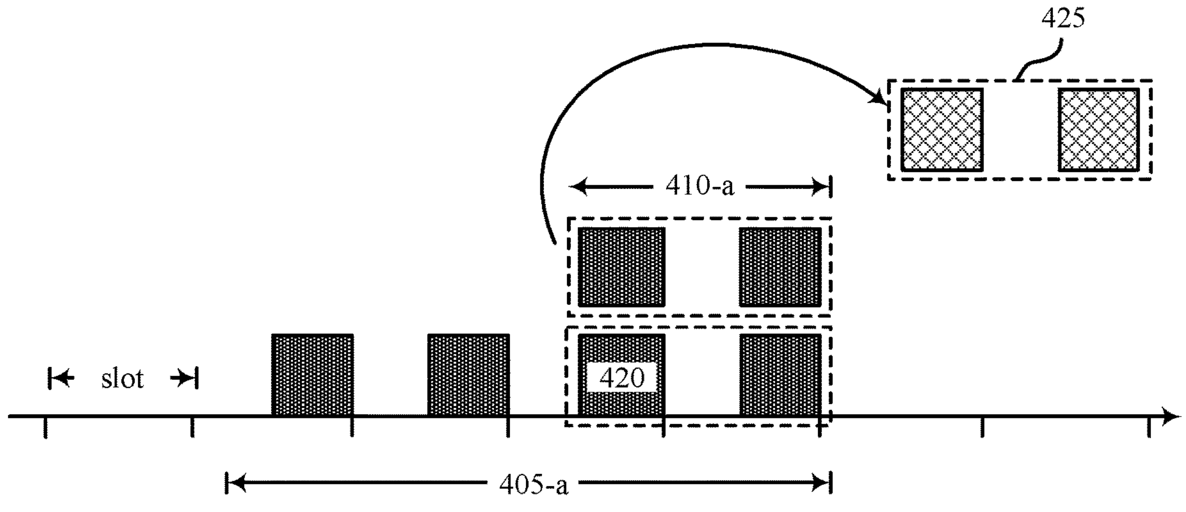

FIGS. 4A, and 4B illustrates an example of an example multiplexing scheme 400-*a* and 400-*b* that support overlap handling for uplink channels with multi-slot transmission time interval in accordance with aspects of the present disclosure. For example, multiplexing schemes 400-*a* and 400-*b* may be implemented at a UE 115 for communication with a base station 105, which may be examples of corresponding devices described with reference to FIGS. 1 through 3.

In FIGS. 4A and 4B, a first multi-slot TTI PUCCH may overlap with a second PUCCH that may be either a single slot or multi-slot PUCCH resource. The first multi-slot PUSCH 405 may be associated with a TB or transmission time interval occupying more than one slot. The number of slots based on which the size of the TB is calculated ay be denoted by the variable M, where M>1 in cases where the first PUCCH is multi-slot. In addition, the second PUCCH 410 may include UCI which is sized over one or more slots (e.g., the UCI may be configured to occupy one or more slots, or the UCI may be explicitly allocated the one or more slots), and the number of slots based on which the UCI size is calculated may be denoted as M', where M'>1 in some examples (e.g., the UCI size is associated with resources of a number of M' slots, a modulation order $Q_m$ and a maximum code rate r). In the example multiplexing schemes 400-*a* and 400-*b* of FIGS. 4A and 4B, the second PUCCH resource 410 is depicted as being multi-slot, however a single slot configuration may also be applicable.

In the first example of multiplexing scheme 400-*a*, the second PUCCH 410-*a* (e.g., a two-slot PUCCH) may overlap with the first PUCCH 405-*a* at a third slot 415 of the first PUCCH 405-*a*. In such cases of overlap, a UE may map the UCI of the second PUCCH 410-*a* to the slot 415 of the first PUCCH 405-*a* (e.g., the first overlapping slot of the first PUCCH 405-*a*) such that the UCI is multiplexed on first PUCCH 405-*a*.

In the second example of multiplexing scheme 400-*b*, the second PUCCH 410-*b* (e.g., a two-slot PUCCH) may overlap with the first PUCCH 405-*b* at a third slot 420 of the first PUCCH 405-*b*. The UE may receive an RRC message from a base station which indicates an additional set of PUCCH resources 425 (e.g., RRC resources that may be from an RRC-configured multi-CSI PUCCH resource list) that the UE may use for transmission of the UCI. In such cases of overlap, a UE may map the UCI of the second PUCCH 410-*b* to the set of additional PUCCH resources 425 such that the UCI is multiplexed on additional set of PUCCH resources 425.

For both multiplexing schemes 400-*a* and 400-*b*, the UE may determine to omit at least a portion of CSI resources from the UCI based on the number of slots occupied by the UCI (e.g., M') in order to maintain a threshold coding rate. For example, if $$(O_{UCI}+O_{CRC}) > N_{RB}^{PUCCH}\cdot N_{sc,ctrl}^{RB}\cdot N_{symb-UC,M'-slot}^{PUCCH}\cdot Q_m\cdot r,$$

and there are multiple CSI reports (e.g., CSI reports or layer 1-based beam management reports) included in the UCI, the UE may omit CSI reports can be omitted according to priority, until a threshold code rate for the UCI (e.g., maxCodeRate r) is satisfied. For example, for a case of a PUCCH (with UCI sized over M' slots) with multiple CSI reports to be conveyed, the CSI reports is omitted until a number of n CSI reports remain, and the UCI payload size associated with the n CSI reports is no larger than $$N_{RB}^{PUCCH}\cdot N_{sc,ctrl}^{RB}\cdot N_{symb-UCI,M'-slot}^{PUCCH}\cdot Q_m\cdot r,$$

while the UCI payload size associated with n+1 CSI reports is larger than $$N_{RB}^{PUCCH}\cdot N_{sc,ctrl}^{RB}\cdot N_{symb-UCI,M'-slot}^{PUCCH}\cdot Q_m\cdot r.$$

Additionally, $$N_{symb-UCI,M'-slot}^{PUCCH}=M'\cdot N_{symb-UCI}^{PUCCH}$$

for uniform DMRS pattern over slots occupied by the CSI.

Figure 5:
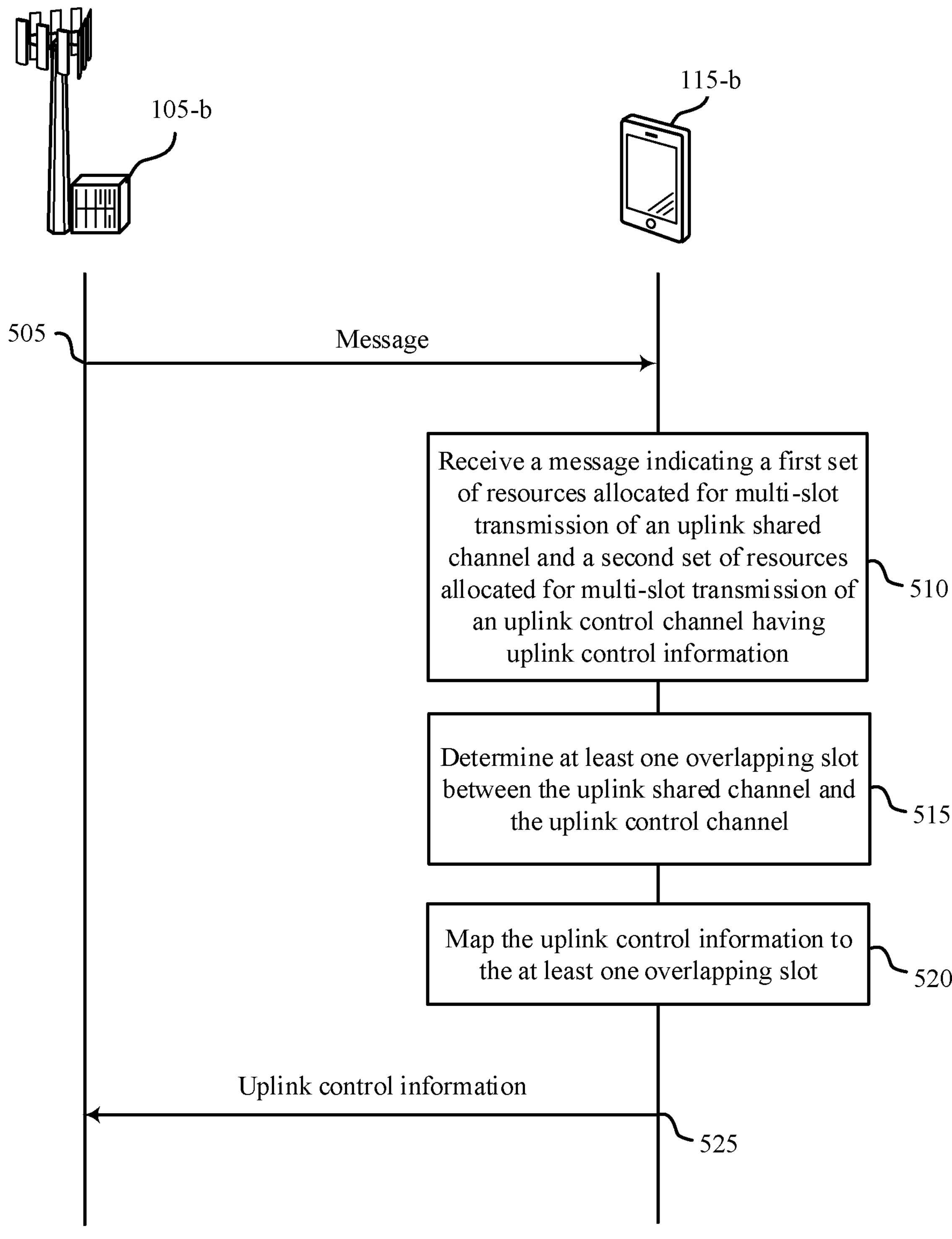
FIGS. 5 through 7 illustrate example process flows that supports overlap handling for uplink channels with multi-slot transmission time interval in accordance with aspects of the present disclosure.

FIG. 5 illustrates an example of a process flow 500 that supports overlap handling for uplink channels with multi-slot transmission time interval in accordance with aspects of the present disclosure. For example, the process flow 500 includes a base station 105-*b*, and a UE 115-*b*, which may be examples of base stations 105 and UE 115 described with reference to FIGS. 1 and 2. Alternative examples of the following may be implemented, where some steps are performed in a different order than described or are not performed at all. In some cases, steps may include additional features not mentioned below, or further steps may be added. In addition, while process flow 500 shows processes between a base station 105-*b* and a UE 115-*b*, it should be understood that these processes may occur between any number of network devices.

At 505, the base station 105-*b* may transmit, and at 510 the UE 115-*b* may receive, a message indicating a first set of resources allocated for multi-slot transmission of an uplink shared channel (e.g., a PUSCH) having a payload sized over a plurality of slots of the first set of resources. The message may further include a second set of resources allocated for multi-slot transmission of an uplink control channel (e.g., a PUCCH) having UCI which has a payload sized over one or more slots of the second set of resources. For example, a multi-slot transmission may support transmission of one or more repetitions of the uplink shared channel. In some cases, the UE 115-*b* may allocate or size the UCI payload to the one or more repetitions such that the UCI may be transmitted with a higher reliability.

At 515, the UE 115-*b* may determine at least one overlapping slot between the plurality of slots of the uplink shared channel and the one or more slots of the uplink control channel.

At 520, the UE 115-*b* may map the UCI of the uplink control channel to the at least one overlapping slot of the uplink shared channel. In some examples, a mapping of the UCI may include multiplexing the UCI with the uplink shared channel on the at least one overlapping slot.

In some examples, the first set of resources allocated for multi-slot transmission of the uplink shared channel is associated with a repetition of a TB of at least two slots (e.g., more than one slot), and the number of slots based on which the size of the TB is calculated may be denoted as M slots (e.g., M>1). The multi-slot uplink shared channel may overlap with a multi-slot uplink control channel (with the number of slots in which the UCI size is calculated is based on M' slots (e.g., M'>1)). In such cases, the UE 115-*b* may map the UCI to a first overlapping slot of the at least one overlapping slot on the uplink shared channel.

In some examples, the number of slots that the UCI occupies may be based on the plurality of slots of the first set of resources, the one or more slots of the second set of resources, or both. For example, in some cases the number of slots that the UCI occupies may be based on M slots, M' slots, or both. In some examples, the upper bound (e.g., maximum) number of REs that the UCI may occupy is determined by the at least one overlapping slot (e.g., the upped bound is upper bounded by the number of overlapped slots ($M_{overlap}$)).

In some examples, the UE 115-*b* may generate a number of encoded bits for the transmission of the UCI on the at least one overlapping slot of the uplink shared channel. The UE 115-*b* may rate match the number of encoded bits to the plurality of slots of the first set of resources based on a total number the plurality of slots (M), a total number of the one or more slots of the second set of resources (M'), and the a total number of overlapping slots ($M_{overlap}$). In some examples, the encoded bits are encoded HARQ bits, and the UE 115-*b* may map the encoded HARQ bits to a set of REs adjacent to and after a first set of consecutive DMRS symbols of the overlapping slots. In some examples, encoded bits are a number of encoded CSI bits, and the UE 115-*b* may map the encoded CSI bits to a first set of symbols that do not carry a DMRS.

At 525, the UE 115-*b* may transmit, to base station 105-*b*, the UCI that is multiplexed on the uplink shared channel in accordance with the mapping of the UCI.

Figure 6:
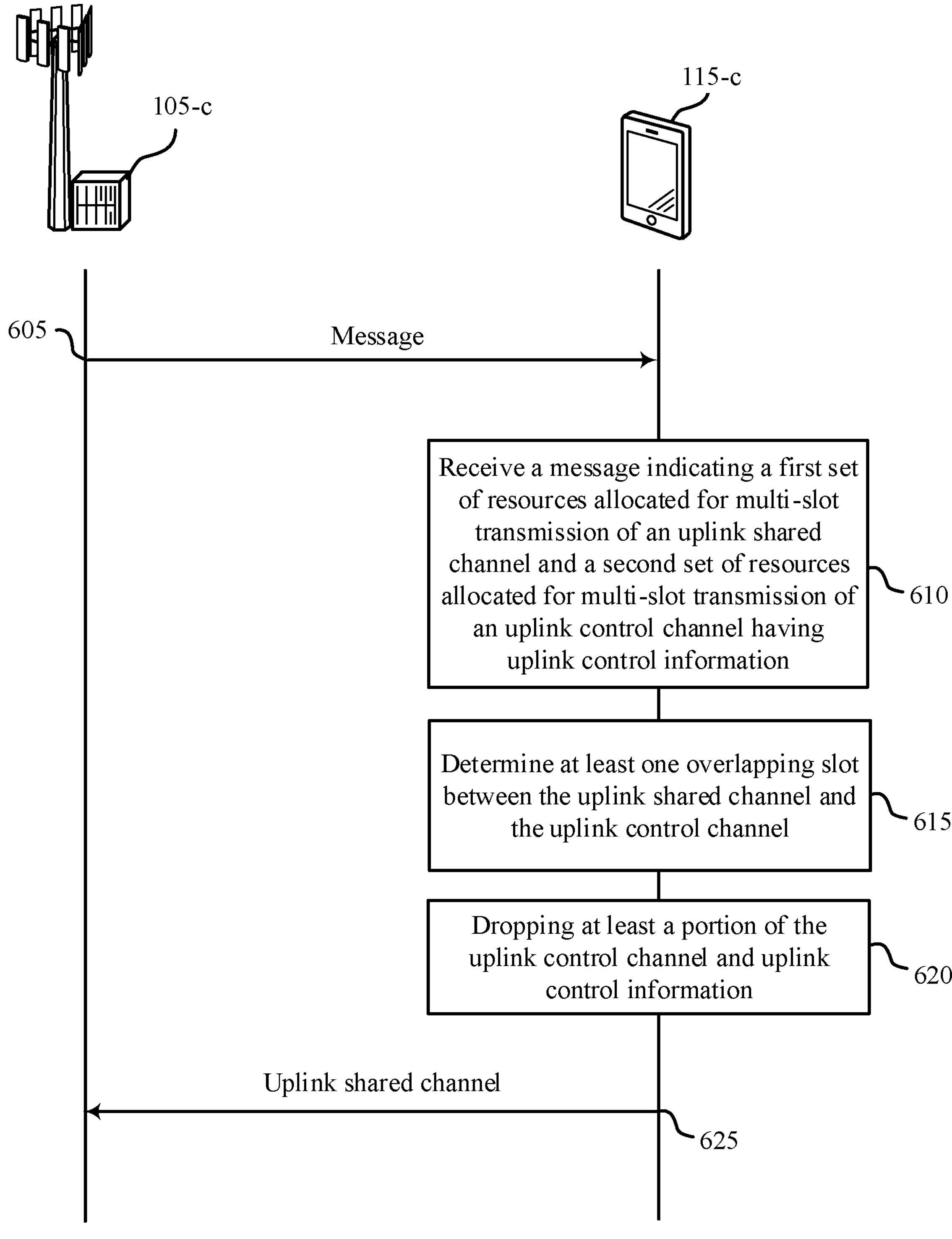

FIG. 6 illustrates an example of a process flow 600 that supports overlap handling for uplink channels with multi-slot transmission time interval in accordance with aspects of the present disclosure. For example, the process flow 600 includes a base station 105-*c* and a UE 115-*c*, which may be examples of base stations 105 and UE 115 described with reference to FIGS. 1, 2, and 5. Alternative examples of the following may be implemented, where some steps are performed in a different order than described or are not performed at all. In some cases, steps may include additional features not mentioned below, or further steps may be added. In addition, while process flow 600 shows processes between a base station 105-*c* and a UE 115-*c*, it should be understood that these processes may occur between any number of network devices.

At 605, the base station 105-*c* may transmit, and at 610 the UE 115-*c* may receive, a message indicating a first set of resources allocated for multi-slot transmission of an uplink shared channel (e.g., a PUSCH) having a payload sized over a plurality of slots of the first set of resources. The message may include a second set of resources allocated for multi-slot transmission of an uplink control channel (e.g., a PUCCH) having UCI which has a payload sized over (e.g., allocated to) one or more slots of the second set of resources.

At 615, the UE 115-*c* may determine at least one overlapping slot between the plurality of slots of the uplink shared channel and the one or more slots of the uplink control channel.

At 620, the UE 115-*c* may drop at least a portion of the uplink control channel and the UCI associated with the uplink control channel based on the at least one overlapping slot. For example, in cases where the UCI includes CSI, the UE 115-*c* may drop the uplink control channel and the UCI based on determining the at least one overlapping slot.

In some examples, the UE 115-*c* may determine that the UCI includes HARQ information or one or more SRs, and the UE 115-*c* may map the HARQ information or the SRs to the at least one overlapping slot of the uplink shared channel. The UE 115-*c*

At 625, the UE 115-*c* may transmit the uplink shared channel in accordance with the dropping of the uplink control channel. For example, the UE 115-*c* may transmit the uplink shared channel without multiplexing the UCI. In some examples, the UE 115-*c* may determine whether to drop the uplink control channel or the uplink shared channel, or both, based on a configuration received from the base station 105-*c*. Thus, in some cases, the determination of whether to drop the UCI may be configurable by UE 115-*c*.

Figure 7:
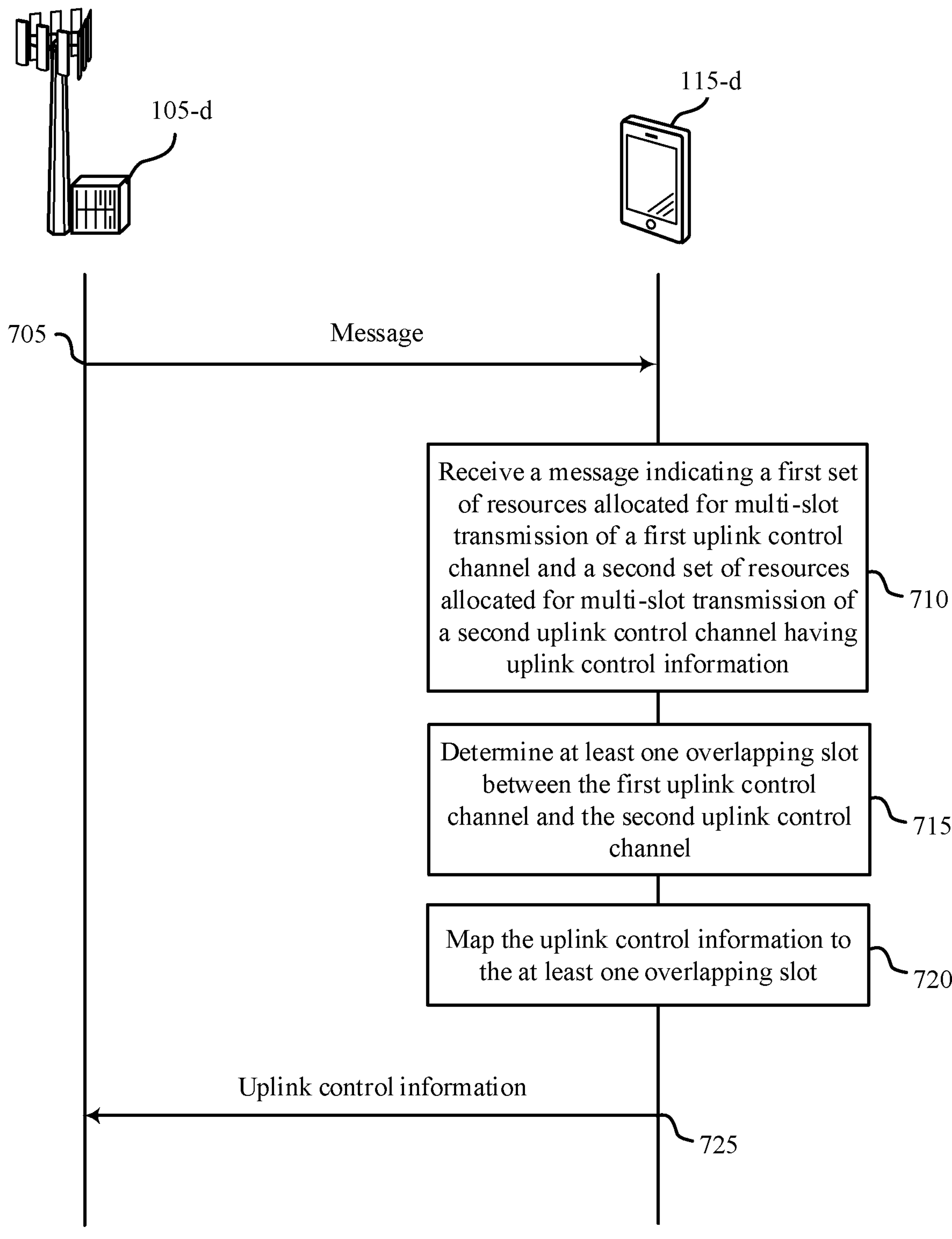

FIG. 7 illustrates an example of a process flow 700 that supports overlap handling for uplink channels with multi-slot transmission time interval in accordance with aspects of the present disclosure. For example, the process flow 700 includes a base station 105-*d* and a UE 115-*d*, which may be examples of base stations 105 and UE 115 described with reference to FIGS. 1, 2, 5, and 6. Alternative examples of the following may be implemented, where some steps are performed in a different order than described or are not performed at all. In some cases, steps may include additional features not mentioned below, or further steps may be added. In addition, while process flow 700 shows processes between a base station 105-*d* and a UE 115-*d*, it should be understood that these processes may occur between any number of network devices.

At 705, the base station 105-*d* may transmit, and at 710 the UE 115-*b* may receive, a message indicating a first set of resources allocated for multi-slot transmission of a first uplink control channel (e.g., a first PUCCH) having a payload sized over (e.g., allocated to) a plurality of slots of the first set of resources. The message may further include a second set of resources allocated for multi-slot transmission of a second uplink control channel (e.g., a second PUCCH) having UCI which has a payload sized over one or more slots of the second set of resources.

At 715, the UE 115-*d* may determine at least one overlapping slot between the plurality of slots of the first uplink control channel and the one or more slots of the second uplink control channel.

At 720, the UE 115-*d* may map the UCI of the first uplink control channel to the at least one overlapping slot of the second uplink shared channel. In some examples, a mapping of the UCI may include multiplexing the UCI with the first uplink shared channel on the at least one overlapping slot.

In some examples, the base station 105-*d* may transmit an RRC message to the UE 115-*d* which indicates an additional set of resources (e.g., RRC resources) allocated for the transmission of the UCI. In such examples, the UE 115-*d* may map the UCI to the additional resources indicated by the base station 105-*d*. In some cases, the additional set of resources may be a configured set of resources dedicated for the transmission of multiple CSI reports. In accordance with mapping the UCI, at least some of the CSI reports may be omitted based on the number of slots in which the UCI size is calculated, a determined priority or a priority rule associated with the CSI reports, or a maximum coding rate.

At 725, the UE 115-*d* may transmit transmitting, to the base station 105-*d*, the UCI on the second uplink control channel based at least in part on the mapping of the UCI.

Figure 8:
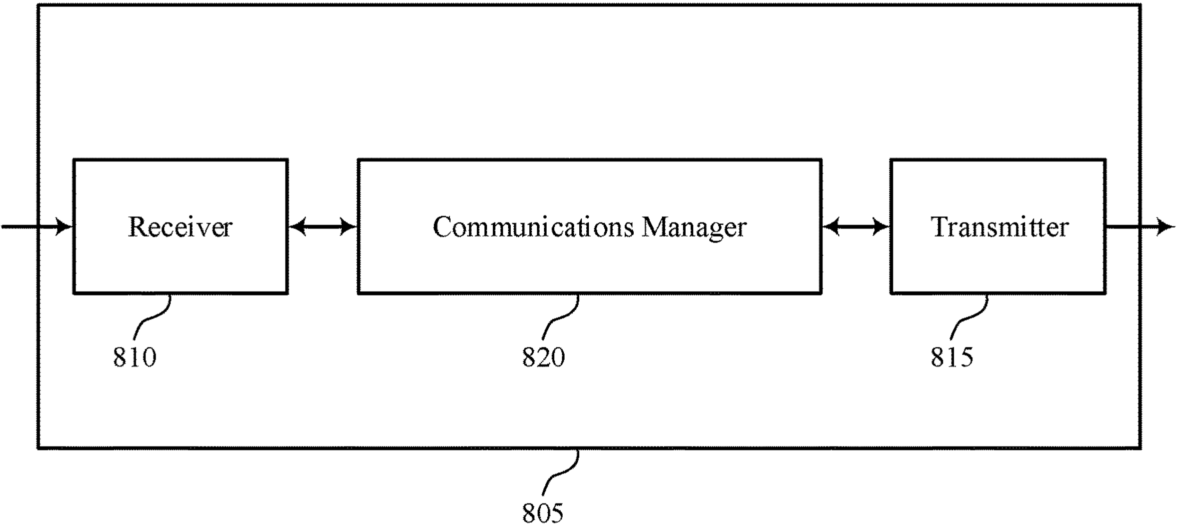
FIGS. 8 and 9 show block diagrams of devices that support overlap handling for uplink channels with multi-slot transmission time interval in accordance with aspects of the present disclosure.

FIG. 8 shows a block diagram 800 of a device 805 that supports overlap handling for uplink channels with multi-slot transmission time interval in accordance with aspects of the present disclosure. The device 805 may be an example of aspects of a UE 115 as described herein. The device 805 may include a receiver 810, a transmitter 815, and a communications manager 820. The device 805 may also include at least one processor. Each of these components may be in communication with one another (e.g., via one or more buses).

The receiver 810 may provide a means for receiving information such as packets, user data, control information, or any combination thereof associated with various information channels (e.g., control channels, data channels, information channels related to overlap handling for uplink channels with multi-slot transmission time interval). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to overlap handling for uplink channels with multi-slot transmission time interval). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of overlap handling for uplink channels with multi-slot transmission time interval as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software) executed by at least one processor. If implemented in code executed by at least one processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The communications manager 820 may be configured as or otherwise support a means for determining at least one overlapping slot between the set of multiple slots of the uplink shared channel and the one or more slots of the uplink control channel. The communications manager 820 may be configured as or otherwise support a means for mapping the UCI of the uplink control channel to the at least one overlapping slot of the uplink shared channel. The communications manager 820 may be configured as or otherwise support a means for transmitting, to a base station, the UCI on the uplink shared channel based on the mapping.

Additionally, or alternatively, the communications manager 820 may support wireless communications at a UE in accordance with examples as disclosed herein. For example, the communications manager 820 may be configured as or otherwise support a means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The communications manager 820 may be configured as or otherwise support a means for determining at least one overlapping slot between the set of multiple slots for the uplink shared channel and the one or more slots of the uplink control channel. The communications manager 820 may be configured as or otherwise support a means for dropping at least a portion of the uplink control channel and UCI associated with the uplink control channel based on the at least one overlapping slot. The communications manager 820 may be configured as or otherwise support a means for transmitting the uplink shared channel in accordance with the dropping of the uplink control channel.

Additionally, or alternatively, the communications manager 820 may support wireless communications at a UE in accordance with examples as disclosed herein. For example, the communications manager 820 may be configured as or otherwise support a means for identifying a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources. The communications manager 820 may be configured as or otherwise support a means for determining at least one overlapping slot between the set of multiple slots of the first uplink control channel and the one or more slots of the second uplink control channel. The communications manager 820 may be configured as or otherwise support a means for mapping UCI of the second uplink control channel to the at least one overlapping slot of the first uplink control channel. The communications manager 820 may be configured as or otherwise support a means for transmitting, to a base station, the UCI on the first uplink control channel based on the mapping.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources, increased communications reliability, and reduced latency.

Figure 9:
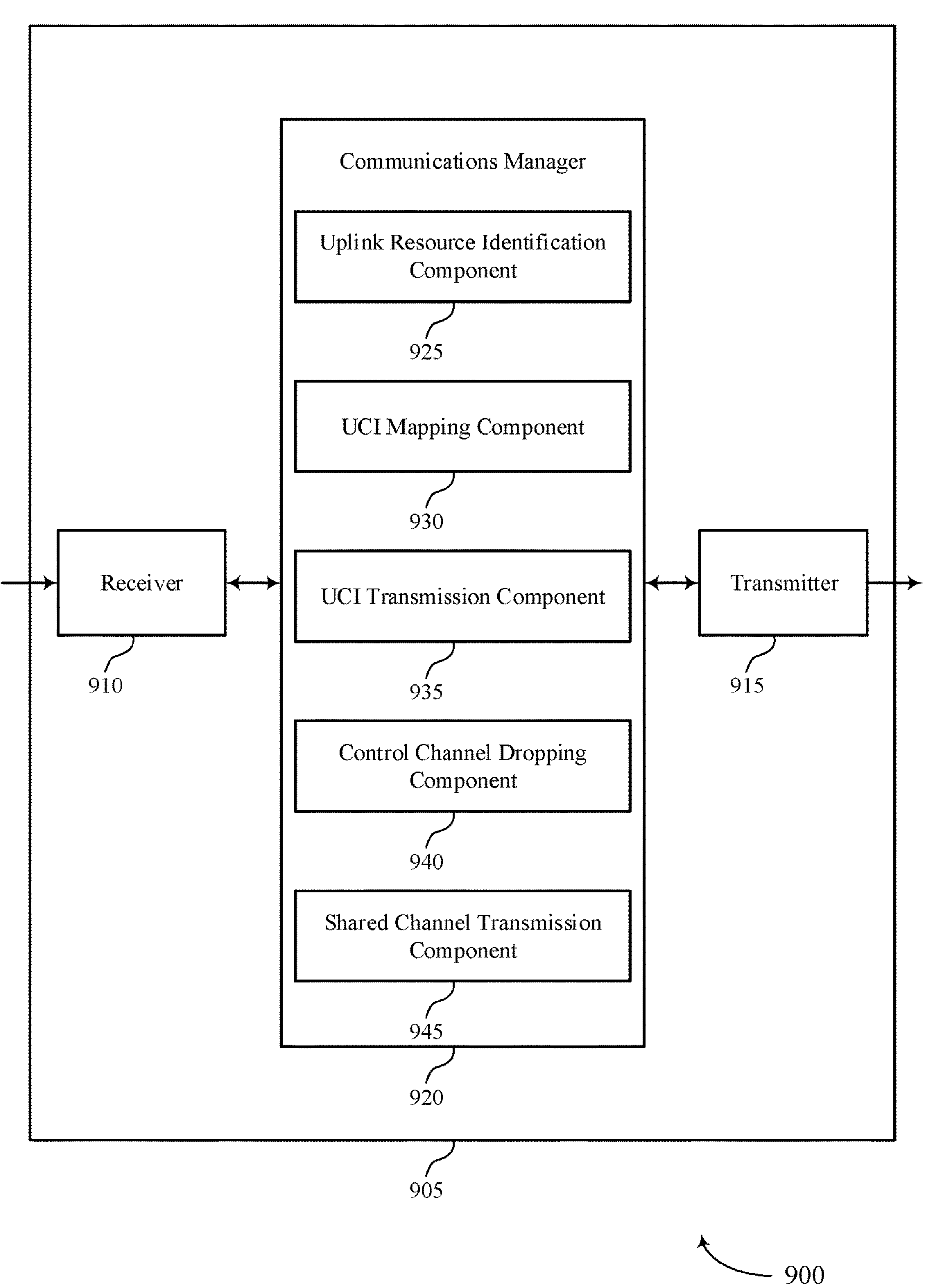

FIG. 9 shows a block diagram 900 of a device 905 that supports overlap handling for uplink channels with multi-slot transmission time interval in accordance with aspects of the present disclosure. The device 905 may be an example of aspects of a device 805 or a UE 115 as described herein. The device 905 may include a receiver 910, a transmitter 915, and a communications manager 920. The device 905 may also include at least one processor. Each of these components may be in communication with one another (e.g., via one or more buses).

The receiver 910 may provide a means for receiving information such as packets, user data, control information, or any combination thereof associated with various information channels (e.g., control channels, data channels, information channels related to overlap handling for uplink channels with multi-slot transmission time interval). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to overlap handling for uplink channels with multi-slot transmission time interval). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of overlap handling for uplink channels with multi-slot transmission time interval as described herein. For example, the communications manager 920 may include an uplink resource identification component 925, a UCI mapping component 930, a UCI transmission component 935, a control channel dropping component 940, a shared channel transmission component 945, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The uplink resource identification component 925 may be configured as or otherwise support a means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The uplink resource identification component 925 may be configured as or otherwise support a means for determining at least one overlapping slot between the set of multiple slots of the uplink shared channel and the one or more slots of the uplink control channel. The UCI mapping component 930 may be configured as or otherwise support a means for mapping the UCI of the uplink control channel to the at least one overlapping slot of the uplink shared channel. The UCI transmission component 935 may be configured as or otherwise support a means for transmitting, to a base station, the UCI on the uplink shared channel based on the mapping.

Additionally, or alternatively, the communications manager 920 may support wireless communications at a UE in accordance with examples as disclosed herein. The uplink resource identification component 925 may be configured as or otherwise support a means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The uplink resource identification component 925 may be configured as or otherwise support a means for determining at least one overlapping slot between the set of multiple slots for the uplink shared channel and the one or more slots of the uplink control channel. The control channel dropping component 940 may be configured as or otherwise support a means for dropping at least a portion of the uplink control channel and UCI associated with the uplink control channel based on the at least one overlapping slot. The shared channel transmission component 945 may be configured as or otherwise support a means for transmitting the uplink shared channel in accordance with the dropping of the uplink control channel.

Additionally, or alternatively, the communications manager 920 may support wireless communications at a UE in accordance with examples as disclosed herein. The uplink resource identification component 925 may be configured as or otherwise support a means for identifying a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources. The uplink resource identification component 925 may be configured as or otherwise support a means for determining at least one overlapping slot between the set of multiple slots of the first uplink control channel and the one or more slots of the second uplink control channel. The UCI mapping component 930 may be configured as or otherwise support a means for mapping UCI of the second uplink control channel to the at least one overlapping slot of the first uplink control channel. The UCI transmission component 935 may be configured as or otherwise support a means for transmitting, to a base station, the UCI on the first uplink control channel based on the mapping.

Figure 10:
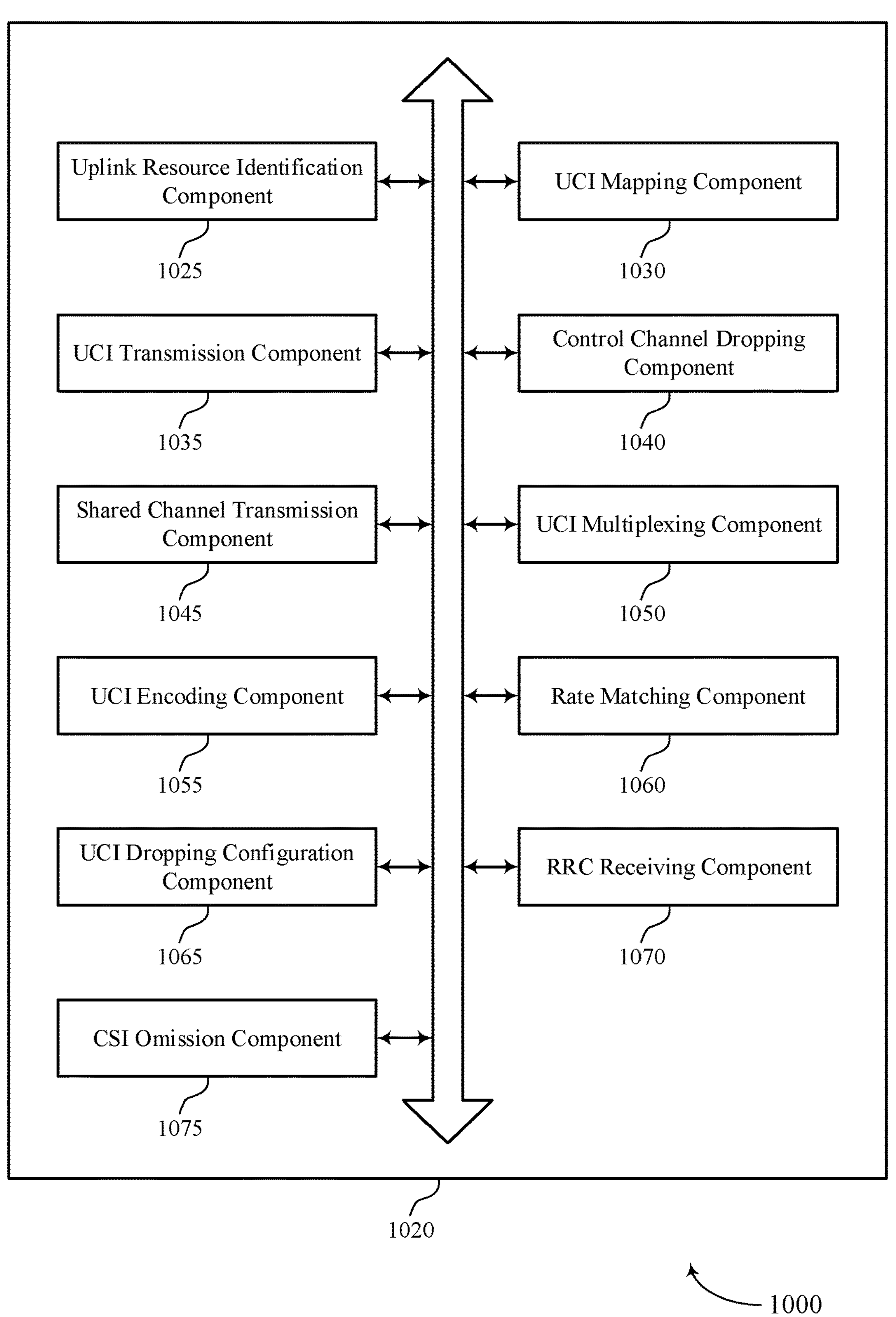
FIG. 10 shows a block diagram of a communications manager that supports overlap handling for uplink channels with multi-slot transmission time interval in accordance with aspects of the present disclosure.

FIG. 10 shows a block diagram 1000 of a communications manager 1020 that supports overlap handling for uplink channels with multi-slot transmission time interval in accordance with aspects of the present disclosure. The communications manager 1020 may be an example of aspects of a communications manager 820, a communications manager 920, or both, as described herein. The communications manager 1020, or various components thereof, may be an example of means for performing various aspects of overlap handling for uplink channels with multi-slot transmission time interval as described herein. For example, the communications manager 1020 may include an uplink resource identification component 1025, a UCI mapping component 1030, a UCI transmission component 1035, a control channel dropping component 1040, a shared channel transmission component 1045, a UCI multiplexing component 1050, a UCI encoding component 1055, a rate matching component 1060, a UCI dropping configuration component 1065, an RRC receiving component 1070, a CSI omission component 1075, or any combination thereof. Each of these components may communicate, directly or indirectly, with one another (e.g., via one or more buses).

The communications manager 1020 may support wireless communications at a UE in accordance with examples as disclosed herein. The uplink resource identification component 1025 may be configured as or otherwise support a means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. In some examples, the uplink resource identification component 1025 may be configured as or otherwise support a means for determining at least one overlapping slot between the set of multiple slots of the uplink shared channel and the one or more slots of the uplink control channel. The UCI mapping component 1030 may be configured as or otherwise support a means for mapping the UCI of the uplink control channel to the at least one overlapping slot of the uplink shared channel. The UCI transmission component 1035 may be configured as or otherwise support a means for transmitting, to a base station, the UCI on the uplink shared channel based on the mapping.

In some examples, the UCI multiplexing component 1050 may be configured as or otherwise support a means for multiplexing the UCI with the uplink shared channel on the at least one overlapping slot based on the mapping.

In some examples, the first set of resources allocated for multi-slot transmission of the uplink shared channel has a payload sized over one or more TB repetitions that include at least two slots, and the UCI mapping component 1030 may be configured as or otherwise support a means for mapping the UCI to the at least one overlapping slot, where the at least one overlapping slot includes a first overlapping slot of the one or more TB repetitions.

In some examples, the uplink resource identification component 1025 may be configured as or otherwise support a means for determining a number of REs occupied by the UCI based on a number of slots of the set of slots of the first set of resources, a number of the one or more slots of the second set of resources, or both.

In some examples, the uplink resource identification component 1025 may be configured as or otherwise support a means for determining an upper bound for a number of REs occupied by the UCI based on the at least one overlapping slot.

In some examples, the UCI encoding component 1055 may be configured as or otherwise support a means for generating a number of encoded bits for a transmission of the UCI on the at least one overlapping slot of the uplink shared channel. In some examples, the rate matching component 1060 may be configured as or otherwise support a means for rate matching the number of encoded bits to the set of multiple slots of the first set of resources based on a total number the set of multiple slots, a total number of the one or more slots of the second set of resources, and the at least one overlapping slot.

In some examples, the UCI mapping component 1030 may be configured as or otherwise support a means for mapping the encoded HARQ bits to a set of REs adjacent to and after a first set of consecutive DMRS symbols.

In some examples, the UCI mapping component 1030 may be configured as or otherwise support a means for mapping the encoded CSI bits to a first set of symbols that do not carry a DMRS. In some examples, a transmission of the uplink shared channel includes a number of repetitions allocated to the first set of resources.

Additionally, or alternatively, the communications manager 1020 may support wireless communications at a UE in accordance with examples as disclosed herein. In some examples, the uplink resource identification component 1025 may be configured as or otherwise support a means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. In some examples, the uplink resource identification component 1025 may be configured as or otherwise support a means for determining at least one overlapping slot between the set of multiple slots for the uplink shared channel and the one or more slots of the uplink control channel. The control channel dropping component 1040 may be configured as or otherwise support a means for dropping at least a portion of the uplink control channel and UCI associated with the uplink control channel based on the at least one overlapping slot. The shared channel transmission component 1045 may be configured as or otherwise support a means for transmitting the uplink shared channel in accordance with the dropping of the uplink control channel.

In some examples, the UCI includes CSI, and the control channel dropping component 1040 may be configured as or otherwise support a means for dropping the uplink control channel and the CSI based on the at least one overlapping slot.

In some examples, the UCI includes HARQ information, and the UCI mapping component 1030 may be configured as or otherwise support a means for mapping the HARQ information to the at least one overlapping slot of the set of multiple slots for the uplink shared channel. In some examples, the UCI includes HARQ information, and the UCI transmission component 1035 may be configured as or otherwise support a means for transmitting the HARQ information based on the mapping.

In some examples, the UCI includes one or more SRs, and the UCI mapping component 1030 may be configured as or otherwise support a means for mapping the one or more SRs to the at least one overlapping slot of the set of multiple slots for the uplink shared channel. In some examples, the UCI includes one or more SRs, and the UCI transmission component 1035 may be configured as or otherwise support a means for transmitting the one or more SRs based on the mapping.

In some examples, the UCI dropping configuration component 1065 may be configured as or otherwise support a means for receiving a configuration indicating whether the UE is to drop the uplink control channel or the uplink shared channel. In some examples, the UCI dropping configuration component 1065 may be configured as or otherwise support a means for determining whether to drop the uplink control channel, the uplink shared channel, or both, based on the configuration.

Additionally, or alternatively, the communications manager 1020 may support wireless communications at a UE in accordance with examples as disclosed herein. In some examples, the uplink resource identification component 1025 may be configured as or otherwise support a means for identifying a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources. In some examples, the uplink resource identification component 1025 may be configured as or otherwise support a means for determining at least one overlapping slot between the set of multiple slots of the first uplink control channel and the one or more slots of the second uplink control channel. In some examples, the UCI mapping component 1030 may be configured as or otherwise support a means for mapping UCI of the second uplink control channel to the at least one overlapping slot of the first uplink control channel. In some examples, the UCI transmission component 1035 may be configured as or otherwise support a means for transmitting, to a base station, the UCI on the first uplink control channel based on the mapping.

In some examples, the UCI multiplexing component 1050 may be configured as or otherwise support a means for multiplexing the UCI with the first uplink control channel on the at least one overlapping slot based on the mapping.

In some examples, the RRC receiving component 1070 may be configured as or otherwise support a means for receiving, from the base station, an RRC message indicating an additional set of resources allocated for transmission of the UCI. In some examples, the UCI mapping component 1030 may be configured as or otherwise support a means for mapping the UCI to the additional set of resources based on the RRC message.

In some examples, the additional set of resources are allocated for one or more CSI reports configured based on the RRC message.

In some examples, the UCI includes one or more CSI reports, and the CSI omission component 1075 may be configured as or otherwise support a means for omitting one or more CSI reports from the mapping based on a number of the one or more slots of the second set of resources.

In some examples, the omitting of the one or more CSI reports is further based on a priority of the one or more CSI reports, a maximum code rate for the UCI, or both.

Figure 11:
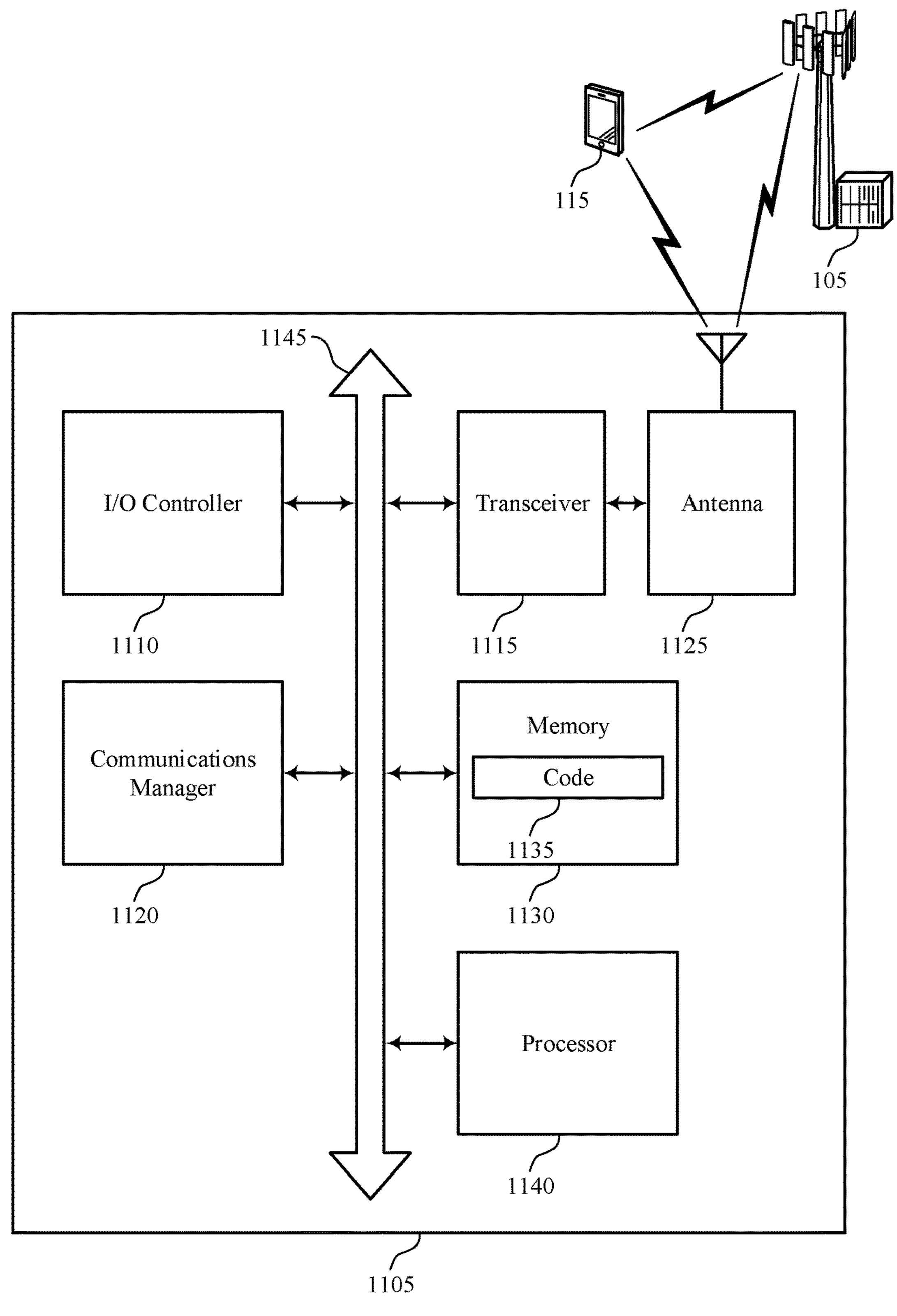
FIG. 11 shows a diagram of a system including a device that supports overlap handling for uplink channels with multi-slot transmission time interval in accordance with aspects of the present disclosure.

FIG. 11 shows a diagram of a system 1100 including a device 1105 that supports overlap handling for uplink channels with multi-slot transmission time interval in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting overlap handling for uplink channels with multi-slot transmission time interval). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The communications manager 1120 may be configured as or otherwise support a means for determining at least one overlapping slot between the set of multiple slots of the uplink shared channel and the one or more slots of the uplink control channel. The communications manager 1120 may be configured as or otherwise support a means for mapping the UCI of the uplink control channel to the at least one overlapping slot of the uplink shared channel. The communications manager 1120 may be configured as or otherwise support a means for transmitting, to a base station, the UCI on the uplink shared channel based on the mapping.

Additionally, or alternatively, the communications manager 1120 may support wireless communications at a UE in accordance with examples as disclosed herein. For example, the communications manager 1120 may be configured as or otherwise support a means for receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The communications manager 1120 may be configured as or otherwise support a means for determining at least one overlapping slot between the set of multiple slots for the uplink shared channel and the one or more slots of the uplink control channel. The communications manager 1120 may be configured as or otherwise support a means for dropping at least a portion of the uplink control channel and UCI associated with the uplink control channel based on the at least one overlapping slot. The communications manager 1120 may be configured as or otherwise support a means for transmitting the uplink shared channel in accordance with the dropping of the uplink control channel.

Additionally, or alternatively, the communications manager 1120 may support wireless communications at a UE in accordance with examples as disclosed herein. For example, the communications manager 1120 may be configured as or otherwise support a means for identifying a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources. The communications manager 1120 may be configured as or otherwise support a means for determining at least one overlapping slot between the set of multiple slots of the first uplink control channel and the one or more slots of the second uplink control channel. The communications manager 1120 may be configured as or otherwise support a means for mapping UCI of the second uplink control channel to the at least one overlapping slot of the first uplink control channel. The communications manager 1120 may be configured as or otherwise support a means for transmitting, to a base station, the UCI on the first uplink control channel based on the mapping.

By including or configuring the communications manager 1120 in accordance with examples as described herein, the device 1105 may support techniques for improved communications reliability, reduced latency, improved user experience related to enhanced uplink collision handling, more efficient utilization of communication resources (e.g., uplink channel utilization), improved coordination between devices, enhanced coverage, and efficient use of device transmission power.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of overlap handling for uplink channels with multi-slot transmission time interval as described herein, or the processor 1140 and the memory 1130 may be otherwise configured to perform or support such operations.

Figure 12:
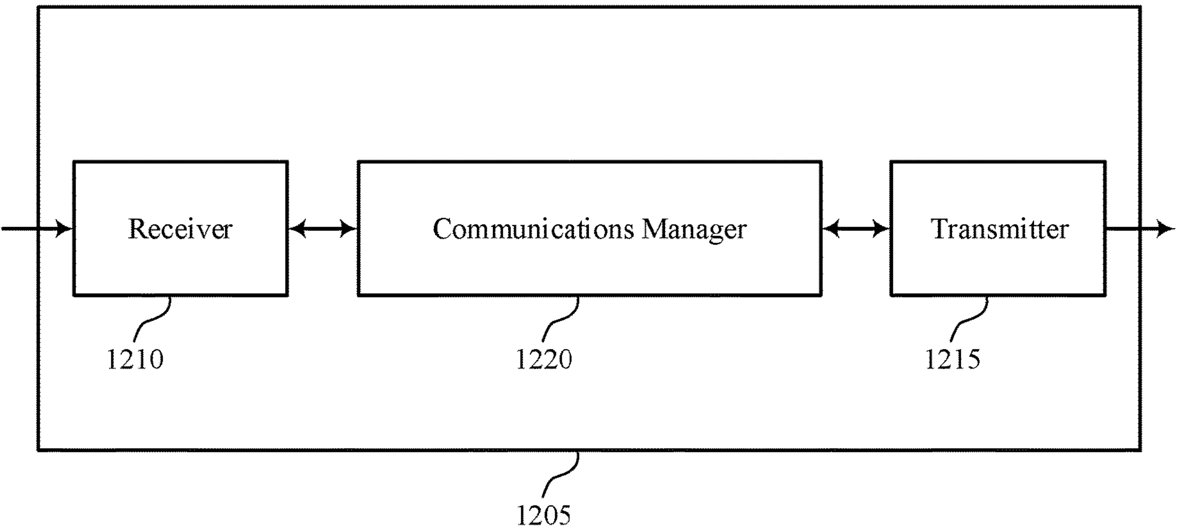
FIGS. 12 and 13 show block diagrams of devices that support overlap handling for uplink channels with multi-slot transmission time interval in accordance with aspects of the present disclosure.

FIG. 12 shows a block diagram 1200 of a device 1205 that supports overlap handling for uplink channels with multi-slot transmission time interval in accordance with aspects of the present disclosure. The device 1205 may be an example of aspects of a base station 105 as described herein. The device 1205 may include a receiver 1210, a transmitter 1215, and a communications manager 1220. The device 1205 may also include at least one processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to overlap handling for uplink channels with multi-slot transmission time interval). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to overlap handling for uplink channels with multi-slot transmission time interval). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of overlap handling for uplink channels with multi-slot transmission time interval as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software) executed by at least one processor. If implemented in code executed by at least one processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel. The communications manager 1220 may be configured as or otherwise support a means for receiving, from the UE, UCI multiplexed on the at least one overlapping slot of the second uplink channel based on the transmitting.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for more efficient utilization of communication resources, reduced latency, increased network coverage, and increased utilization of uplink resources.

Figure 13:
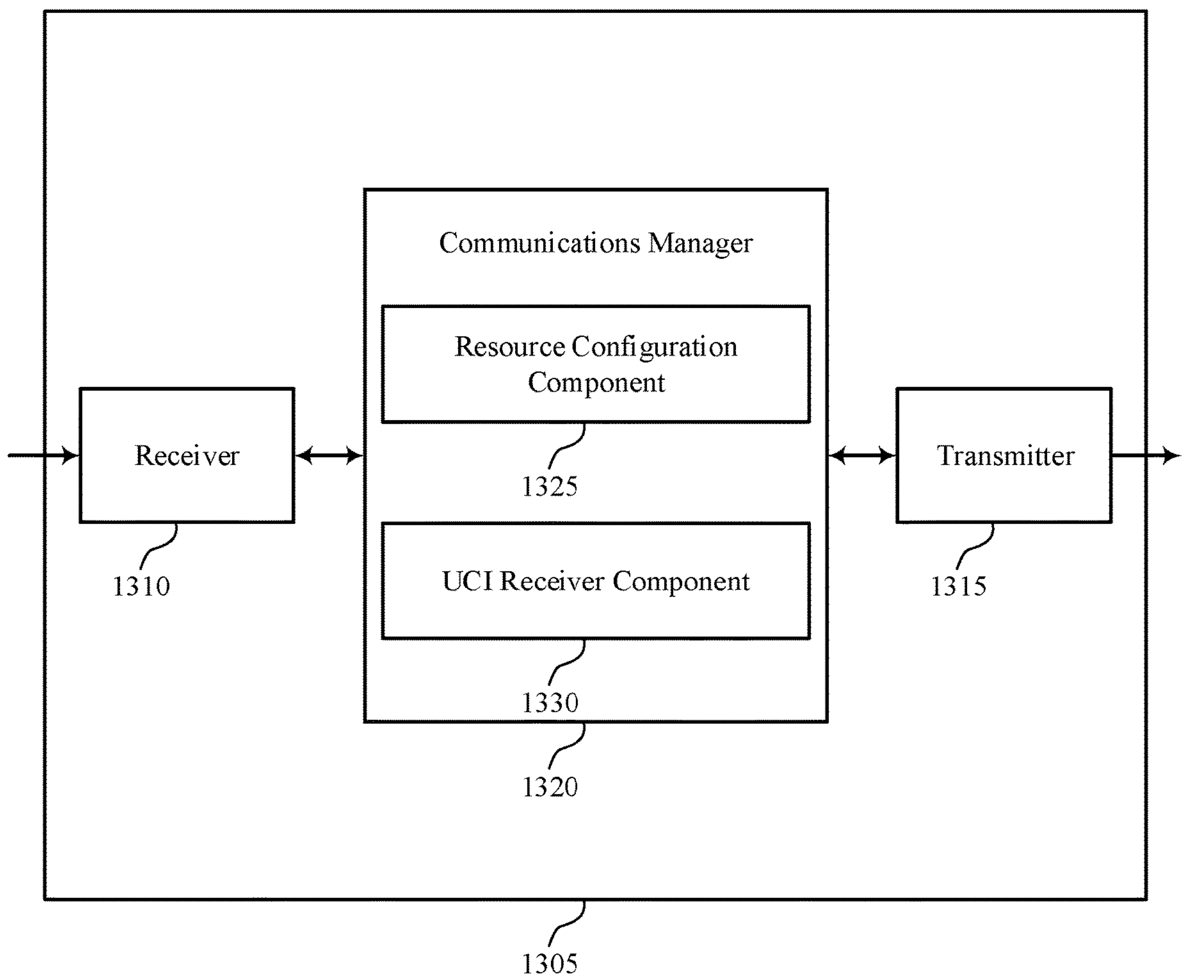
Figure 13:

FIG. 13 shows a block diagram 1300 of a device 1305 that supports overlap handling for uplink channels with multi-slot transmission time interval in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to overlap handling for uplink channels with multi-slot transmission time interval). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to overlap handling for uplink channels with multi-slot transmission time interval). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of overlap handling for uplink channels with multi-slot transmission time interval as described herein. For example, the communications manager 1320 may include a resource configuration component 1325 a UCI receiver component 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The resource configuration component 1325 may be configured as or otherwise support a means for transmitting, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel. The UCI receiver component 1330 may be configured as or otherwise support a means for receiving, from the UE, UCI multiplexed on the at least one overlapping slot of the second uplink channel based on the transmitting.

Figure 14:
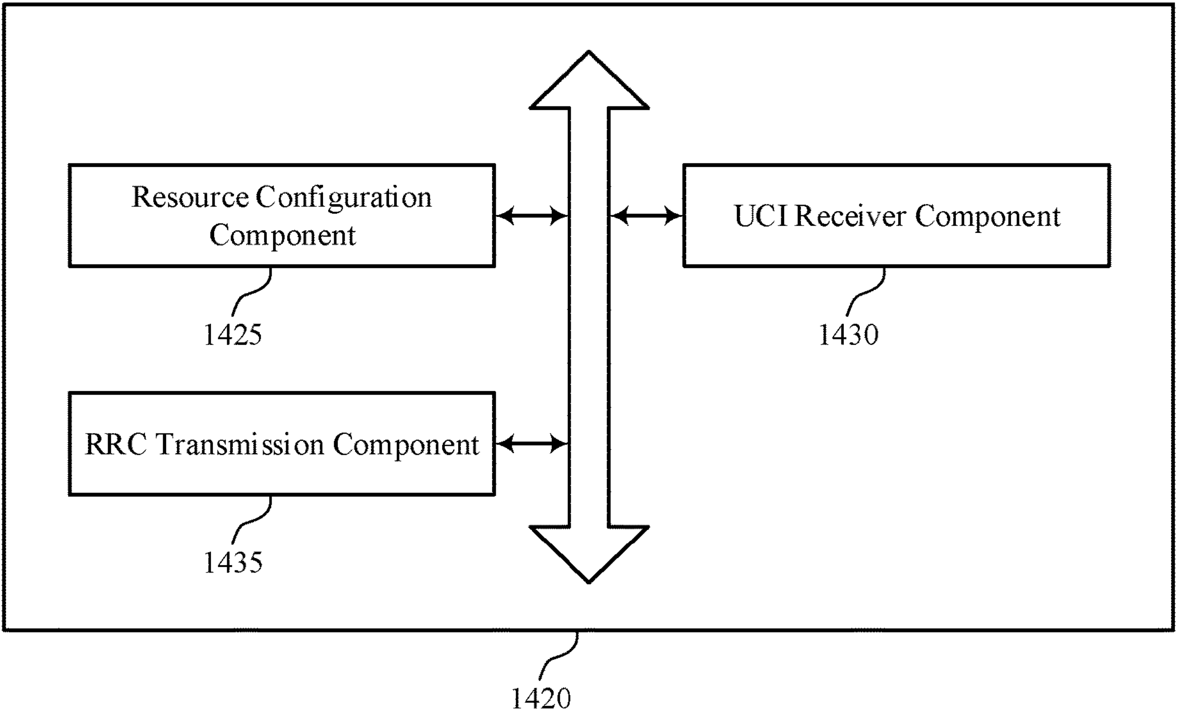
FIG. 14 shows a block diagram of a communications manager that supports overlap handling for uplink channels with multi-slot transmission time interval in accordance with aspects of the present disclosure.

FIG. 14 shows a block diagram 1400 of a communications manager 1420 that supports overlap handling for uplink channels with multi-slot transmission time interval in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of overlap handling for uplink channels with multi-slot transmission time interval as described herein. For example, the communications manager 1420 may include a resource configuration component 1425, a UCI receiver component 1430, an RRC transmission component 1435, or any combination thereof. Each of these components may communicate, directly or indirectly, with one another (e.g., via one or more buses).

The communications manager 1420 may support wireless communications at a base station in accordance with examples as disclosed herein. The resource configuration component 1425 may be configured as or otherwise support a means for transmitting, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel. The UCI receiver component 1430 may be configured as or otherwise support a means for receiving, from the UE, UCI multiplexed on the at least one overlapping slot of the second uplink channel based on the transmitting.

In some examples, the first uplink channel includes an uplink shared channel and the second uplink channel includes an uplink control channel, and the UCI receiver component 1430 may be configured as or otherwise support a means for receiving, from the UE, the UCI of the uplink shared channel multiplexed on the at least one overlapping slot of the uplink shared channel.

In some examples, the first uplink channel includes an uplink shared channel and the second uplink channel includes an uplink control channel, and the UCI receiver component 1430 may be configured as or otherwise support a means for receiving a multi-slot transmission of the uplink shared channel that is not multiplexed with the UCI.

In some examples, the first uplink channel includes a first uplink control channel and the second uplink channel includes a second uplink control channel, and the UCI receiver component 1430 may be configured as or otherwise support a means for receiving, from the UE, the UCI of the second uplink control channel multiplexed on the at least one overlapping slot of the first uplink control channel.

In some examples, the first uplink channel includes a first uplink control channel and the second uplink channel includes a second uplink control channel, and the resource configuration component 1425 may be configured as or otherwise support a means for identifying an additional set of uplink control channel resources for transmission of the UCI. In some examples, the first uplink channel includes a first uplink control channel and the second uplink channel includes a second uplink control channel, and the RRC transmission component 1435 may be configured as or otherwise support a means for transmitting, to the UE, an RRC message indicating the additional set of uplink control channel resources. In some examples, the first uplink channel includes a first uplink control channel and the second uplink channel includes a second uplink control channel, and the UCI receiver component 1430 may be configured as or otherwise support a means for receiving, from the UE, the UCI on the additional set of uplink control channel resources based on the transmitting the RRC message.

Figure 15:
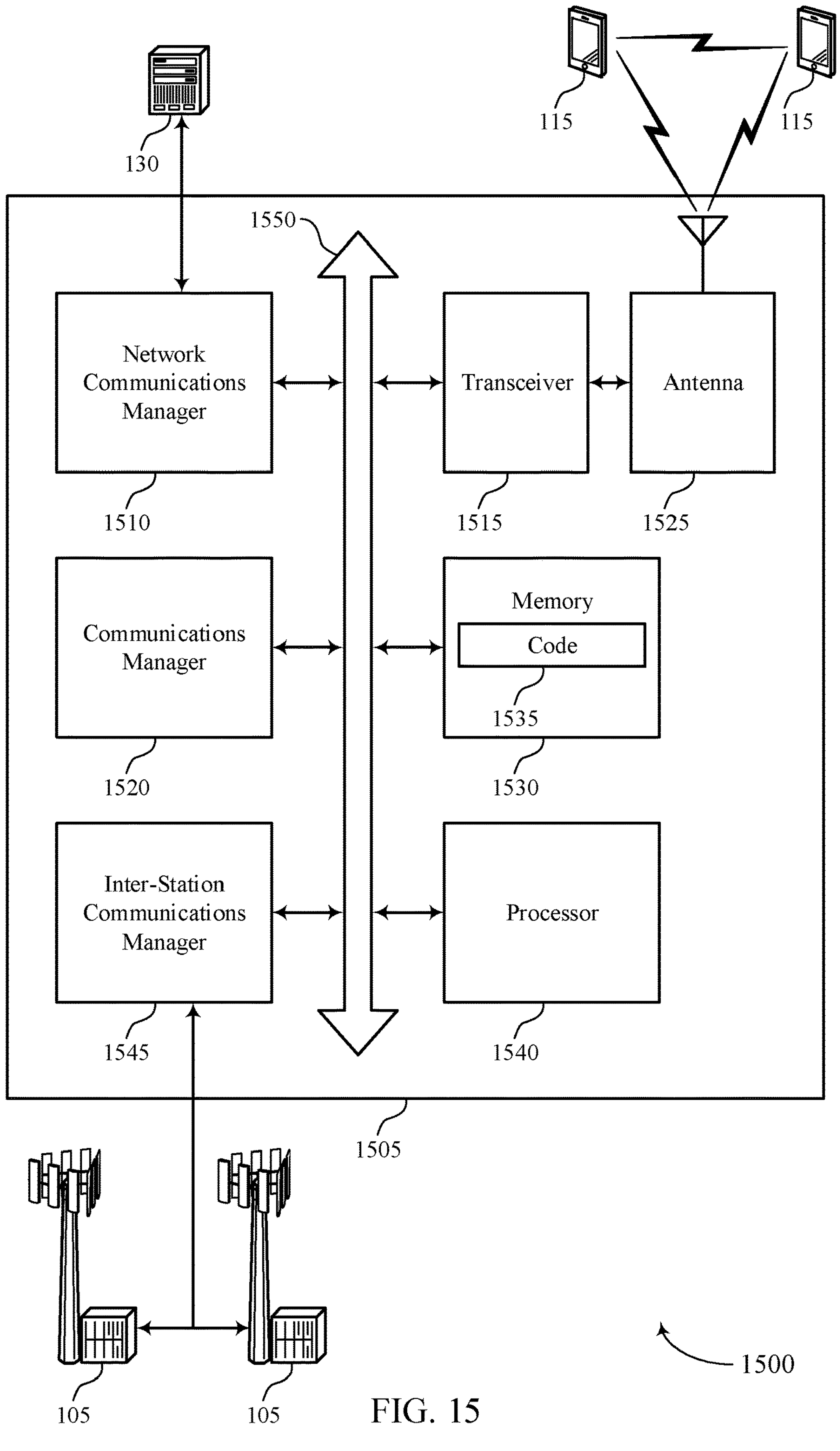
FIG. 15 shows a diagram of a system including a device that supports overlap handling for uplink channels with multi-slot transmission time interval in accordance with aspects of the present disclosure.

FIG. 15 shows a diagram of a system 1500 including a device 1505 that supports overlap handling for uplink channels with multi-slot transmission time interval in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting overlap handling for uplink channels with multi-slot transmission time interval). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel. The communications manager 1520 may be configured as or otherwise support a means for receiving, from the UE, UCI multiplexed on the at least one overlapping slot of the second uplink channel based on the transmitting.

By including or configuring the communications manager 1520 in accordance with examples as described herein, the device 1505 may support techniques for improved communications reliability, reduced latency, improved user experience related to enhanced uplink collision handling, more efficient utilization of communication resources (e.g., uplink channel utilization), improved coordination between devices, enhanced coverage, and efficient use of device transmission power.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of overlap handling for uplink channels with multi-slot transmission time interval as described herein, or the processor 1540 and the memory 1530 may be otherwise configured to perform or support such operations.

Figure 16:
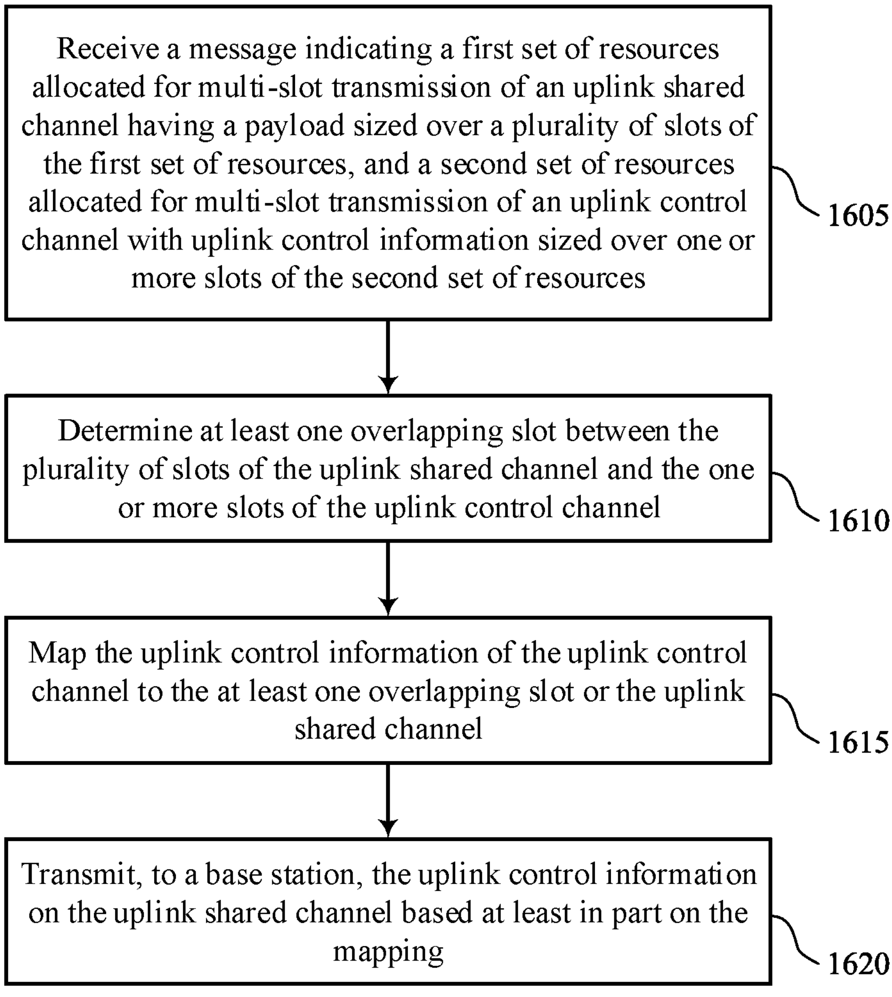

FIG. 16 shows a flowchart illustrating a method 1600 that supports overlap handling for uplink channels with multi-slot transmission time interval in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The operations of 1605 may be performed in accordance with examples as disclosed herein. In some examples, aspects of the operations of 1605 may be performed by an uplink resource identification component 1025 as described with reference to FIG. 10.

At 1610, the method may include determining at least one overlapping slot between the set of multiple slots of the uplink shared channel and the one or more slots of the uplink control channel. The operations of 1610 may be performed in accordance with examples as disclosed herein. In some examples, aspects of the operations of 1610 may be performed by an uplink resource identification component 1025 as described with reference to FIG. 10.

At 1615, the method may include mapping the UCI of the uplink control channel to the at least one overlapping slot of the uplink shared channel. The operations of 1615 may be performed in accordance with examples as disclosed herein. In some examples, aspects of the operations of 1615 may be performed by a UCI mapping component 1030 as described with reference to FIG. 10.

At 1620, the method may include transmitting, to a base station, the UCI on the uplink shared channel based on the mapping. The operations of 1620 may be performed in accordance with examples as disclosed herein. In some examples, aspects of the operations of 1620 may be performed by a UCI transmission component 1035 as described with reference to FIG. 10.

Figure 17:
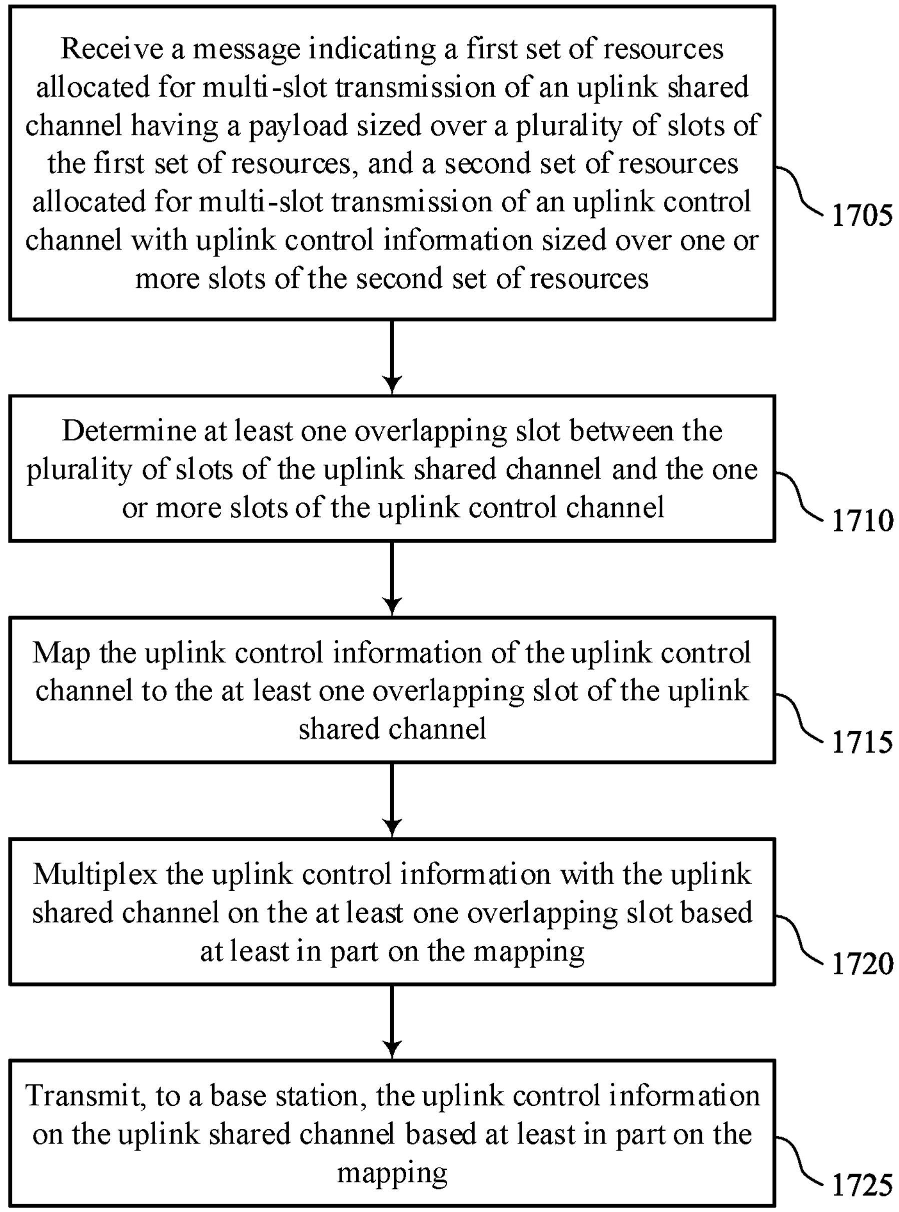

FIG. 17 shows a flowchart illustrating a method 1700 that supports overlap handling for uplink channels with multi-slot transmission time interval in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The operations of 1705 may be performed in accordance with examples as disclosed herein. In some examples, aspects of the operations of 1705 may be performed by an uplink resource identification component 1025 as described with reference to FIG. 10.

At 1710, the method may include determining at least one overlapping slot between the set of multiple slots of the uplink shared channel and the one or more slots of the uplink control channel. The operations of 1710 may be performed in accordance with examples as disclosed herein. In some examples, aspects of the operations of 1710 may be performed by an uplink resource identification component 1025 as described with reference to FIG. 10.

At 1715, the method may include mapping the UCI of the uplink control channel to the at least one overlapping slot of the uplink shared channel. The operations of 1715 may be performed in accordance with examples as disclosed herein. In some examples, aspects of the operations of 1715 may be performed by a UCI mapping component 1030 as described with reference to FIG. 10.

At 1720, the method may include multiplexing the UCI with the uplink shared channel on the at least one overlapping slot based on the mapping. The operations of 1720 may be performed in accordance with examples as disclosed herein. In some examples, aspects of the operations of 1720 may be performed by a UCI multiplexing component 1050 as described with reference to FIG. 10.

At 1725, the method may include transmitting, to a base station, the UCI on the uplink shared channel based on the mapping. The operations of 1725 may be performed in accordance with examples as disclosed herein. In some examples, aspects of the operations of 1725 may be performed by a UCI transmission component 1035 as described with reference to FIG. 10.

Figure 18:
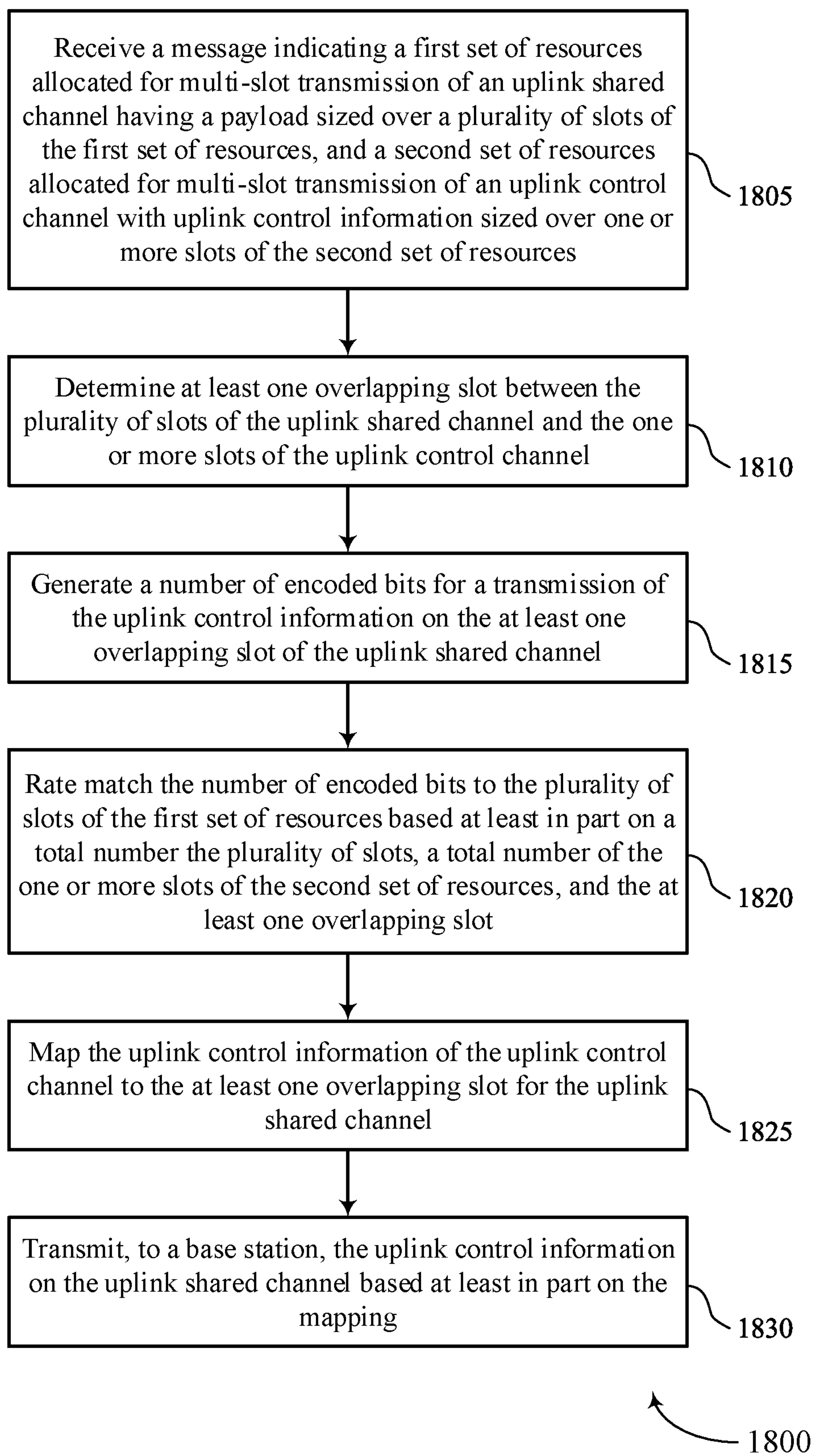

FIG. 18 shows a flowchart illustrating a method 1800 that supports overlap handling for uplink channels with multi-slot transmission time interval in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The operations of 1805 may be performed in accordance with examples as disclosed herein. In some examples, aspects of the operations of 1805 may be performed by an uplink resource identification component 1025 as described with reference to FIG. 10.

At 1810, the method may include determining at least one overlapping slot between the set of multiple slots of the uplink shared channel and the one or more slots of the uplink control channel. The operations of 1810 may be performed in accordance with examples as disclosed herein. In some examples, aspects of the operations of 1810 may be performed by an uplink resource identification component 1025 as described with reference to FIG. 10.

At 1815, the method may include generating a number of encoded bits for a transmission of the UCI on the at least one overlapping slot of the uplink shared channel. The operations of 1815 may be performed in accordance with examples as disclosed herein. In some examples, aspects of the operations of 1815 may be performed by a UCI encoding component 1055 as described with reference to FIG. 10.

At 1820, the method may include rate matching the number of encoded bits to the set of multiple slots of the first set of resources based on a total number the set of multiple slots, a total number of the one or more slots of the second set of resources, and the at least one overlapping slot. The operations of 1820 may be performed in accordance with examples as disclosed herein. In some examples, aspects of the operations of 1820 may be performed by a rate matching component 1060 as described with reference to FIG. 10.

At 1825, the method may include mapping the UCI of the uplink control channel to the at least one overlapping slot of the uplink shared channel. The operations of 1825 may be performed in accordance with examples as disclosed herein. In some examples, aspects of the operations of 1825 may be performed by a UCI mapping component 1030 as described with reference to FIG. 10.

At 1830, the method may include transmitting, to a base station, the UCI on the uplink shared channel based on the mapping. The operations of 1830 may be performed in accordance with examples as disclosed herein. In some examples, aspects of the operations of 1830 may be performed by a UCI transmission component 1035 as described with reference to FIG. 10.

Figure 19:
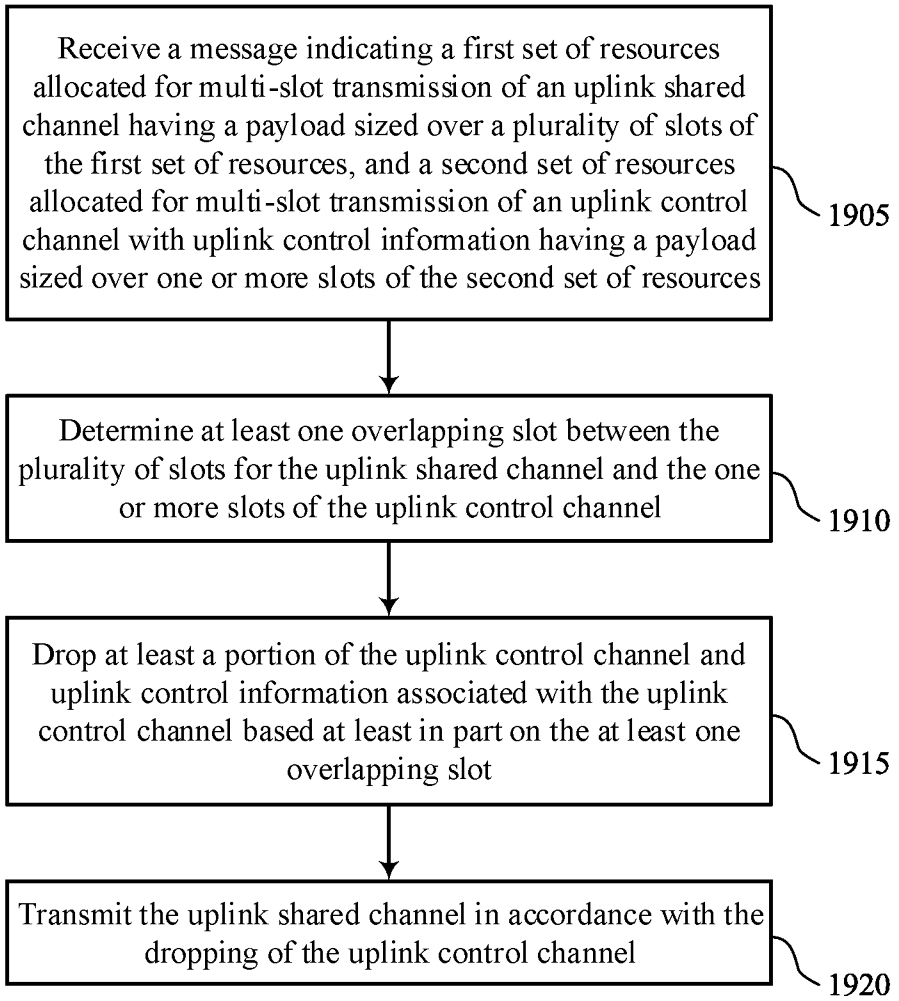

FIG. 19 shows a flowchart illustrating a method 1900 that supports overlap handling for uplink channels with multi-slot transmission time interval in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving a message indicating a first set of resources allocated for multi-slot transmission of an uplink shared channel having a payload sized over a set of multiple slots of the first set of resources, and a second set of resources allocated for multi-slot transmission of an uplink control channel with UCI having a payload sized over one or more slots of the second set of resources. The operations of 1905 may be performed in accordance with examples as disclosed herein. In some examples, aspects of the operations of 1905 may be performed by an uplink resource identification component 1025 as described with reference to FIG. 10.

At 1910, the method may include determining at least one overlapping slot between the set of multiple slots for the uplink shared channel and the one or more slots of the uplink control channel. The operations of 1910 may be performed in accordance with examples as disclosed herein. In some examples, aspects of the operations of 1910 may be performed by an uplink resource identification component 1025 as described with reference to FIG. 10.

At 1915, the method may include dropping at least a portion of the uplink control channel and UCI associated with the uplink control channel based on the at least one overlapping slot. The operations of 1915 may be performed in accordance with examples as disclosed herein. In some examples, aspects of the operations of 1915 may be performed by a control channel dropping component 1040 as described with reference to FIG. 10.

At 1920, the method may include transmitting the uplink shared channel in accordance with the dropping of the uplink control channel. The operations of 1920 may be performed in accordance with examples as disclosed herein. In some examples, aspects of the operations of 1920 may be performed by a shared channel transmission component 1045 as described with reference to FIG. 10.

Figure 20:
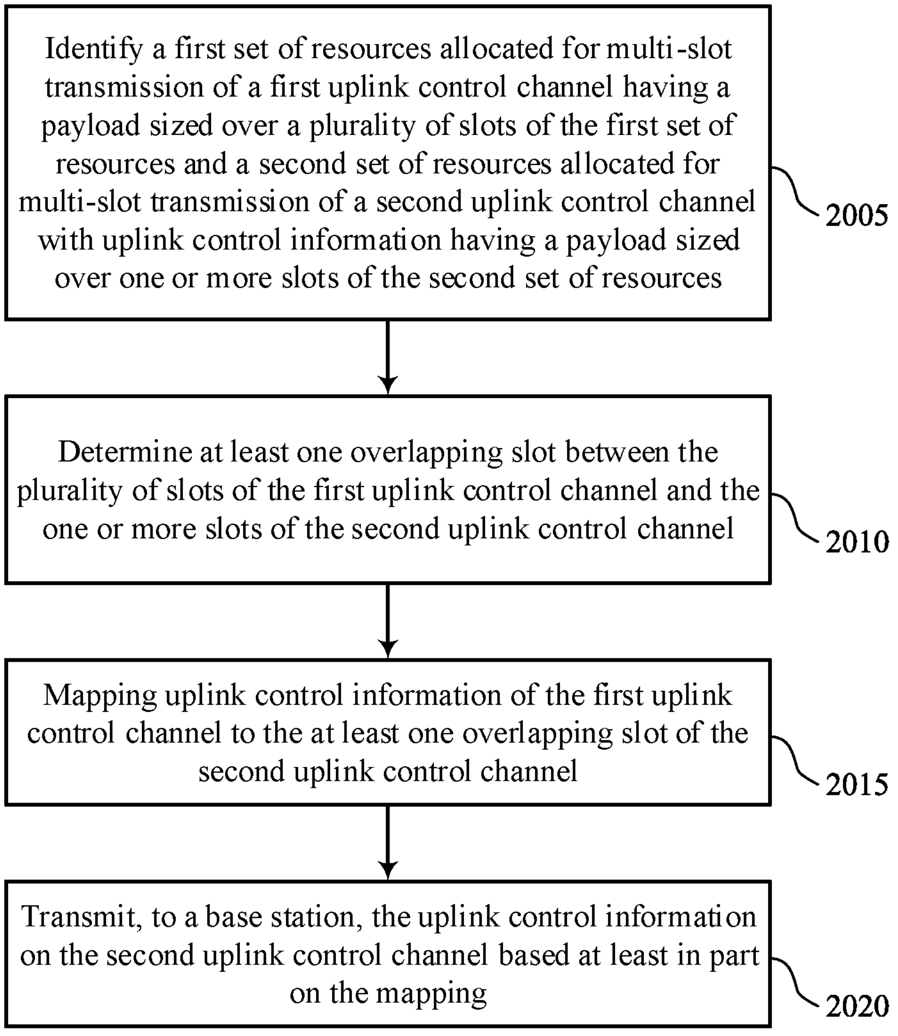

FIG. 20 shows a flowchart illustrating a method 2000 that supports overlap handling for uplink channels with multi-slot transmission time interval in accordance with aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2005, the method may include identifying a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources. The operations of 2005 may be performed in accordance with examples as disclosed herein. In some examples, aspects of the operations of 2005 may be performed by an uplink resource identification component 1025 as described with reference to FIG. 10.

At 2010, the method may include determining at least one overlapping slot between the set of multiple slots of the first uplink control channel and the one or more slots of the second uplink control channel. The operations of 2010 may be performed in accordance with examples as disclosed herein. In some examples, aspects of the operations of 2010 may be performed by an uplink resource identification component 1025 as described with reference to FIG. 10.

At 2015, the method may include mapping UCI of the second uplink control channel to the at least one overlapping slot of the first uplink control channel. The operations of 2015 may be performed in accordance with examples as disclosed herein. In some examples, aspects of the operations of 2015 may be performed by a UCI mapping component 1030 as described with reference to FIG. 10.

At 2020, the method may include transmitting, to a base station, the UCI on the first uplink control channel based on the mapping. The operations of 2020 may be performed in accordance with examples as disclosed herein. In some examples, aspects of the operations of 2020 may be performed by a UCI transmission component 1035 as described with reference to FIG. 10.

Figure 21:
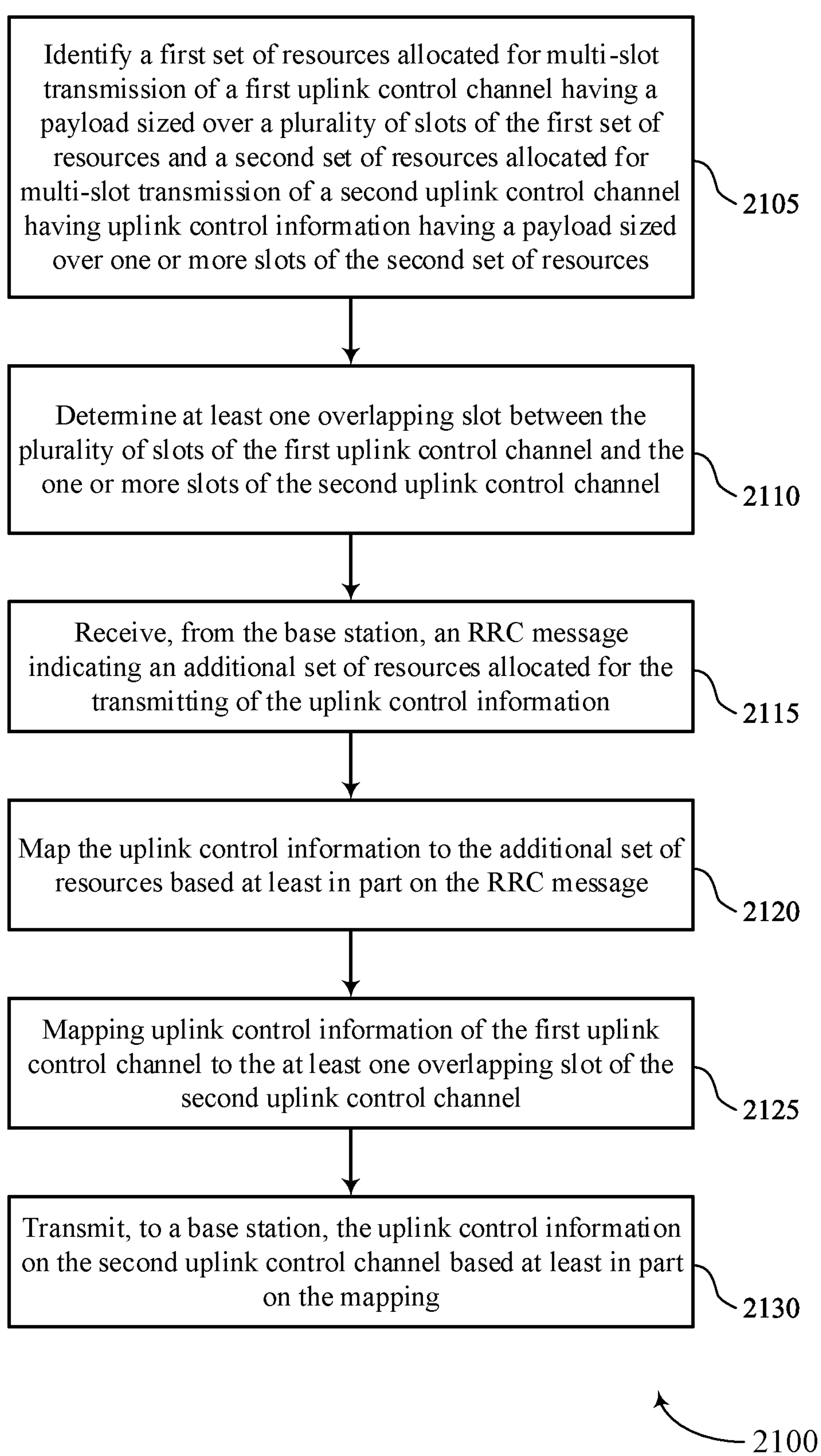

FIG. 21 shows a flowchart illustrating a method 2100 that supports overlap handling for uplink channels with multi-slot transmission time interval in accordance with aspects of the present disclosure. The operations of the method 2100 may be implemented by a UE or its components as described herein. For example, the operations of the method 2100 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2105, the method may include identifying a first set of resources allocated for multi-slot transmission of a first uplink control channel having a payload sized over a set of multiple slots of the first set of resources and a second set of resources allocated for multi-slot transmission of a second uplink control channel with UCI having a payload sized over one or more slots of the second set of resources. The operations of 2105 may be performed in accordance with examples as disclosed herein. In some examples, aspects of the operations of 2105 may be performed by an uplink resource identification component 1025 as described with reference to FIG. 10.

At 2110, the method may include determining at least one overlapping slot between the set of multiple slots of the first uplink control channel and the one or more slots of the second uplink control channel. The operations of 2110 may be performed in accordance with examples as disclosed herein. In some examples, aspects of the operations of 2110 may be performed by an uplink resource identification component 1025 as described with reference to FIG. 10.

At 2115, the method may include receiving, from the base station, an RRC message indicating an additional set of resources allocated for transmission of the UCI. The operations of 2115 may be performed in accordance with examples as disclosed herein. In some examples, aspects of the operations of 2115 may be performed by an RRC receiving component 1070 as described with reference to FIG. 10.

At 2120, the method may include mapping the UCI to the additional set of resources based on the RRC message. The operations of 2120 may be performed in accordance with examples as disclosed herein. In some examples, aspects of the operations of 2120 may be performed by a UCI mapping component 1030 as described with reference to FIG. 10.

At 2125, the method may include mapping UCI of the second uplink control channel to the at least one overlapping slot of the first uplink control channel. The operations of 2125 may be performed in accordance with examples as disclosed herein. In some examples, aspects of the operations of 2125 may be performed by a UCI mapping component 1030 as described with reference to FIG. 10.

At 2130, the method may include transmitting, to a base station, the UCI on the first uplink control channel based on the mapping. The operations of 2130 may be performed in accordance with examples as disclosed herein. In some examples, aspects of the operations of 2130 may be performed by a UCI transmission component 1035 as described with reference to FIG. 10.

FIG. 22 shows a flowchart illustrating a method 2200 that supports overlap handling for uplink channels with multi-slot transmission time interval in accordance with aspects of the present disclosure. The operations of the method 2200 may be implemented by a base station or its components as described herein. For example, the operations of the method 2200 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2205, the method may include transmitting, to a UE, a message indicating a first set of resources allocated for multi-slot transmission of a first uplink channel having a payload sized over a set of multiple slots of the first set of resources and a second set of resources allocated for multi-slot transmission of a second uplink channel with UCI having a payload sized over one or more slots of the second set of resources, where at least one overlapping slot exists between the set of multiple slots of the first uplink channel and the one or more slots of the second uplink channel. The operations of 2205 may be performed in accordance with examples as disclosed herein. In some examples, aspects of the operations of 2205 may be performed by a resource configuration component 1425 as described with reference to FIG. 14.

At 2210, the method may include receiving, from the UE, UCI multiplexed on the at least one overlapping slot of the second uplink channel based on the transmitting. The operations of 2210 may be performed in accordance with examples as disclosed herein. In some examples, aspects of the operations of 2210 may be performed by a UCI receiver component 1430 as described with reference to FIG. 14.

SUMMARY OF ASPECTS

The following provides an overview of aspects of the present disclosure:

Aspect 1: A method for wireless communications at a UE, comprising: receiving a message indicating a first set of resources allocated for multi-slot transmission of an uplink shared channel having a payload sized over a plurality of slots of the first set of resources, and a second set of resources allocated for multi-slot transmission of an uplink control channel with uplink control information (UCI) having a payload sized over one or more slots of the second set of resources; determining at least one overlapping slot between the plurality of slots of the uplink shared channel and the one or more slots of the uplink control channel; mapping the UCI of the uplink control channel to the at least one overlapping slot of the uplink shared channel; and transmitting, to a base station, the UCI on the uplink shared channel based at least in part on the mapping.

Aspect 2: The method of aspect 1, further comprising: multiplexing the UCI with the uplink shared channel on the at least one overlapping slot based at least in part on the mapping.

Aspect 3: The method of any of aspects 1 through 2, wherein the first set of resources allocated for multi-slot transmission of the uplink shared channel having a payload sized over one or more transmission block (TB) repetitions comprises at least two slots, the method further comprising: mapping the UCI to the at least one overlapping slot, wherein the at least one overlapping slot comprises a first overlapping slot of the one or more TB repetitions.

Aspect 4: The method of any of aspects 1 through 3, further comprising: determining a number of resource elements (REs) occupied by the UCI based at least in part on a number of the plurality of slots of the first set of resources, a number of the one or more slots of the second set of resources, or both.

Aspect 5: The method of any of aspects 1 through 4, further comprising: determining an upper bound for a number of REs occupied by the UCI based at least in part on the at least one overlapping slot.

Aspect 6: The method of any of aspects 1 through 5, further comprising: generating a number of encoded bits for a transmission of the UCI on the at least one overlapping slot of the uplink shared channel; rate matching the number of encoded bits to the plurality of slots of the first set of resources based at least in part on a total number the plurality of slots, a total number of the one or more slots of the second set of resources, and the at least one overlapping slot.

Aspect 7: The method of aspect 6, wherein the number of encoded bits comprise a number of encoded HARQ bits, the rate matching further comprising: mapping the encoded HARQ bits to a set of REs adjacent to and after a first set of consecutive DMRS symbols.

Aspect 8: The method of any of aspects 6 through 7, wherein the number of encoded bits comprise a number of encoded channel status information (CSI) bits, the rate matching further comprising: mapping the encoded CSI bits to a first set of symbols that do not carry a DMRS.

Aspect 9: The method of any of aspects 1 through 8, wherein a transmission of the uplink shared channel comprises a number of repetitions allocated to the first set of resources.

Aspect 10: A method for wireless communications at a UE, comprising: receiving a message indicating a first set of resources allocated for multi-slot transmission of an uplink shared channel having a payload sized over a plurality of slots of the first set of resources, and a second set of resources allocated for multi-slot transmission of an uplink control channel with UCI having a payload sized over one or more slots of the second set of resources; determining at least one overlapping slot between the plurality of slots for the uplink shared channel and the one or more slots of the uplink control channel; dropping at least a portion of the uplink control channel and UCI associated with the uplink control channel based at least in part on the at least one overlapping slot; and transmitting the uplink shared channel in accordance with the dropping of the uplink control channel.

Aspect 11: The method of aspect 10, wherein the UCI comprises CSI, the method further comprising: dropping the uplink control channel and the CSI based at least in part on the a least one overlapping slot.

Aspect 12: The method of any of aspects 10 through 11, wherein the UCI comprises HARQ information, the method further comprising: mapping the HARQ information to the at least one overlapping slot of the plurality of slots for the uplink shared channel; and transmitting the HARQ information based at least in part on the mapping.

Aspect 13: The method of any of aspects 10 through 12, wherein the UCI comprises one or more scheduling requests, the method further comprising: mapping the one or more scheduling requests to the at least one overlapping slot of the plurality of slots for the uplink shared channel; and transmitting the one or more scheduling requests based at least in part on the mapping.

Aspect 14: The method of any of aspects 10 through 13, further comprising: receiving a configuration indicating whether the UE is to drop the uplink control channel or the uplink shared channel; and determining whether to drop the uplink control channel, the uplink shared channel, or both, based at least in part on the configuration.

Aspect 15: A method for wireless communications at a UE, comprising: identifying a first set of resources allocated for multi-slot transmission of a first uplink control channel having a payload sized over a plurality of slots of the first set of resources and a second set of resources allocated for multi-slot transmission of a second uplink control channel with UCI having a payload sized over one or more slots of the second set of resources; determining at least one overlapping slot between the plurality of slots of the first uplink control channel and the one or more slots of the second uplink control channel; mapping UCI of the second uplink control channel to the at least one overlapping slot of the first uplink control channel; and transmitting, to a base station, the UCI on the first uplink control channel based at least in part on the mapping.

Aspect 16: The method of aspect 15, further comprising: multiplexing the UCI with the first uplink control channel on the at least one overlapping slot based at least in part on the mapping.

Aspect 17: The method of any of aspects 15 through 16, further comprising: receiving, from the base station, an RRC message indicating an additional set of resources allocated for transmission of the UCI; and mapping the UCI to the additional set of resources based at least in part on the RRC message.

Aspect 18: The method of aspect 17, wherein the additional set of resources are allocated for one or more CSI reports configured based at least in part on the RRC message.

Aspect 19: The method of any of aspects 15 through 18, wherein the UCI comprises one or more CSI reports, the method further comprising: omitting one or more CSI reports from the mapping based at least in part on a number of the one or more slots of the second set of resources.

Aspect 20: The method of aspect 19, wherein the omitting of the one or more CSI reports is further based at least in part on a priority of the one or more CSI reports, a maximum code rate for the UCI, or both.

Aspect 21: A method for wireless communications at a base station, comprising: transmitting, to a UE, a message indicating a first set of resources allocated for multi-slot transmission of a first uplink channel having a payload sized over a plurality of slots of the first set of resources and a second set of resources allocated for multi-slot transmission of a second uplink channel with UCI having a payload sized over one or more slots of the second set of resources, wherein at least one overlapping slot exists between the plurality of slots of the first uplink channel and the one or more slots of the second uplink channel; and receiving, from the UE, UCI multiplexed on the at least one overlapping slot of the second uplink channel based at least in part on the transmitting.

Aspect 22: The method of aspect 21, wherein the first uplink channel comprises an uplink shared channel and the second uplink channel comprises an uplink control channel, the method further comprising: receiving, from the UE, the UCI of the uplink shared channel multiplexed on the at least one overlapping slot of the uplink shared channel.

Aspect 23: The method of any of aspects 21 through 22, wherein the first uplink channel comprises an uplink shared channel and the second uplink channel comprises an uplink control channel, the method further comprising: receiving a multi-slot transmission of the uplink shared channel that is not multiplexed with the UCI.

Aspect 24: The method of any of aspects 21 through 23, wherein the first uplink channel comprises a first uplink control channel and the second uplink channel comprises a second uplink control channel, the method further comprising: receiving, from the UE, the UCI of the second uplink control channel multiplexed on the at least one overlapping slot of the first uplink control channel.

Aspect 25: The method of any of aspects 21 through 24, wherein the first uplink channel comprises a first uplink control channel and the second uplink channel comprises a second uplink control channel, the method further comprising: identifying an additional set of uplink control channel resources for transmission of the UCI; and transmitting, to the UE, an RRC message indicating the additional set of uplink control channel resources; and receiving, from the UE, the UCI on the additional set of uplink control channel resources based at least in part on the transmitting the RRC message.

Aspect 26: An apparatus for wireless communications at a UE, comprising a processor; memory coupled with the processor; and instructions stored in the memory and executable by the processor to cause the apparatus to perform a method of any of aspects 1 through 9.

Aspect 27: An apparatus for wireless communications at a UE, comprising at least one means for performing a method of any of aspects 1 through 9.

Aspect 28: A non-transitory computer-readable medium storing code for wireless communications at a UE, the code comprising instructions executable by a processor to perform a method of any of aspects 1 through 9.

Aspect 29: An apparatus for wireless communications at a UE, comprising a processor; memory coupled with the processor; and instructions stored in the memory and executable by the processor to cause the apparatus to perform a method of any of aspects 10 through 14.

Aspect 30: An apparatus for wireless communications at a UE, comprising at least one means for performing a method of any of aspects 10 through 14.

Aspect 31: A non-transitory computer-readable medium storing code for wireless communications at a UE, the code comprising instructions executable by a processor to perform a method of any of aspects 10 through 14.

Aspect 32: An apparatus for wireless communications at a UE, comprising a processor; memory coupled with the processor; and instructions stored in the memory and executable by the processor to cause the apparatus to perform a method of any of aspects 15 through 20.

Aspect 33: An apparatus for wireless communications at a UE, comprising at least one means for performing a method of any of aspects 15 through 20.

Aspect 34: A non-transitory computer-readable medium storing code for wireless communications at a UE, the code comprising instructions executable by a processor to perform a method of any of aspects 15 through 20.

Aspect 35: An apparatus for wireless communications at a base station, comprising a processor; memory coupled with the processor; and instructions stored in the memory and executable by the processor to cause the apparatus to perform a method of any of aspects 21 through 25.

Aspect 36: An apparatus for wireless communications at a base station, comprising at least one means for performing a method of any of aspects 21 through 25.

Aspect 37: A non-transitory computer-readable medium storing code for wireless communications at a base station, the code comprising instructions executable by a processor to perform a method of any of aspects 21 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or both. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving a message indicating a first set of resources allocated for multi-slot transmission of an uplink shared channel having a payload sized over a plurality of slots of the first set of resources, and a second set of resources allocated for multi-slot transmission of an uplink control channel with uplink control information having a payload sized over one or more slots of the second set of resources;

determining at least one overlapping slot between the plurality of slots of the uplink shared channel and the one or more slots of the uplink control channel;

mapping the uplink control information of the uplink control channel to the at least one overlapping slot of the uplink shared channel; and transmitting, to a base station, the uplink control information on the uplink shared channel based at least in part on the mapping.

2. The method of claim 1, further comprising:

multiplexing the uplink control information with the uplink shared channel on the at least one overlapping slot based at least in part on the mapping.

3. The method of claim 1, wherein the first set of resources allocated for the multi-slot transmission of the uplink shared channel having the payload sized over one or more transmission block repetitions comprises at least two slots, the method further comprising:

mapping the uplink control information to the at least one overlapping slot, wherein the at least one overlapping slot comprises a first overlapping slot of the one or more transmission block repetitions.

4. The method of claim 1, further comprising:

determining a number of resource elements occupied by the uplink control information based at least in part on a number of the plurality of slots of the first set of resources, a number of the one or more slots of the second set of resources, or both.

5. The method of claim 1, further comprising:

determining an upper bound for a number of resource elements occupied by the uplink control information based at least in part on the at least one overlapping slot.

6. The method of claim 1, further comprising:

generating a number of encoded bits for a transmission of the uplink control information on the at least one overlapping slot of the uplink shared channel; and rate matching the number of encoded bits to the plurality of slots of the first set of resources based at least in part on a total number the plurality of slots, a total number of the one or more slots of the second set of resources, and the at least one overlapping slot.

7. The method of claim 6, wherein the rate matching of the number of encoded bits comprises:

mapping a number of encoded hybrid automatic repeat request (HARQ) bits of the number of encoded bits to a set of resource elements adjacent to and after a first set of consecutive demodulation reference signal (DMRS) symbols.

8. The method of claim 6, wherein the rate matching of the number of encoded bits comprises:

mapping a number of encoded channel state information (CSI) bits of the number of encoded bits to a first set of symbols that do not carry a demodulation reference signal (DMRS).

9. The method of claim 1, wherein a transmission of the uplink shared channel comprises a number of repetitions allocated to the first set of resources.

10. A method for wireless communications at a user equipment (UE), comprising:

receiving a message indicating a first set of resources allocated for multi-slot transmission of an uplink shared channel having a payload sized over a plurality of slots of the first set of resources, and a second set of resources allocated for multi-slot transmission of an uplink control channel with uplink control information having a payload sized over one or more slots of the second set of resources;

determining at least one overlapping slot between the plurality of slots for the uplink shared channel and the one or more slots of the uplink control channel;

dropping at least a portion of the uplink control channel and the uplink control information associated with the uplink control channel based at least in part on the at least one overlapping slot; and transmitting the uplink shared channel in accordance with the dropping of at least the portion of the uplink control channel.

11. The method of claim 10, wherein the uplink control information comprises channel state information, the method further comprising:

dropping at least the portion of the uplink control channel and the channel state information based at least in part on the at least one overlapping slot.

12. The method of claim 10, wherein the uplink control information comprises hybrid automatic repeat request (HARQ) information, the method further comprising:

mapping the HARQ information to the at least one overlapping slot of the plurality of slots for the uplink shared channel; and transmitting the HARQ information based at least in part on the mapping.

13. The method of claim 10, wherein the uplink control information comprises one or more scheduling requests, the method further comprising:

mapping the one or more scheduling requests to the at least one overlapping slot of the plurality of slots for the uplink shared channel; and transmitting the one or more scheduling requests based at least in part on the mapping.

14. The method of claim 10, further comprising:

receiving a configuration indicating whether the UE is to drop the uplink control channel or the uplink shared channel; and determining whether to drop the uplink control channel, the uplink shared channel, or both, based at least in part on the configuration.

15. A method for wireless communications at a user equipment (UE), comprising:

identifying a first set of resources allocated for multi-slot transmission of a first uplink control channel having a payload sized over a plurality of slots of the first set of resources and a second set of resources allocated for multi-slot transmission of a second uplink control channel with uplink control information having a payload sized over one or more slots of the second set of resources;

determining at least one overlapping slot between the plurality of slots of the first uplink control channel and the one or more slots of the second uplink control channel;

mapping the uplink control information of the second uplink control channel to the at least one overlapping slot of the first uplink control channel; and transmitting, to a base station, the uplink control information on the first uplink control channel based at least in part on the mapping.

16. The method of claim 15, further comprising:

multiplexing the uplink control information with the first uplink control channel on the at least one overlapping slot based at least in part on the mapping.

17. The method of claim 15, further comprising:

receiving, from the base station, a radio resource control (RRC) message indicating an additional set of resources allocated for transmission of the uplink control information; and mapping the uplink control information to the additional set of resources based at least in part on the RRC message.

18. The method of claim 17, wherein the additional set of resources are allocated for one or more channel state information reports configured based at least in part on the RRC message.

19. The method of claim 15, wherein the uplink control information comprises one or more channel state information reports, the method further comprising:

omitting the one or more channel state information reports from the mapping based at least in part on a number of the one or more slots of the second set of resources.

20. The method of claim 19, wherein omission of the one or more channel state information reports is further based at least in part on a priority of the one or more channel state information reports, a maximum code rate for the uplink control information, or both.

21. A method for wireless communications at a base station, comprising:

transmitting, to a user equipment (UE), a message indicating a first set of resources allocated for multi-slot transmission of a first uplink channel having a payload sized over a plurality of slots of the first set of resources and a second set of resources allocated for multi-slot transmission of a second uplink channel with uplink control information having a payload sized over one or more slots of the second set of resources, wherein at least one overlapping slot exists between the plurality of slots of the first uplink channel and the one or more slots of the second uplink channel; and receiving, from the UE, the uplink control information multiplexed on the at least one overlapping slot of the first uplink channel based at least in part on the transmitting.

22. The method of claim 21, wherein the first uplink channel comprises an uplink shared channel and the second uplink channel comprises an uplink control channel, the method further comprising:

receiving, from the UE, the uplink control information of the uplink control channel multiplexed on the at least one overlapping slot of the uplink shared channel.

23. The method of claim 21, wherein the first uplink channel comprises an uplink shared channel and the second uplink channel comprises an uplink control channel, the method further comprising:

receiving a multi-slot transmission of the uplink shared channel that is not multiplexed with the uplink control information.

24. The method of claim 21, wherein the first uplink channel comprises a first uplink control channel and the second uplink channel comprises a second uplink control channel, the method further comprising:

receiving, from the UE, the uplink control information of the second uplink control channel multiplexed on the at least one overlapping slot of the first uplink control channel.

25. The method of claim 21, wherein the first uplink channel comprises a first uplink control channel and the second uplink channel comprises a second uplink control channel, the method further comprising:

identifying an additional set of uplink control channel resources for transmission of the uplink control information;

transmitting, to the UE, a radio resource control (RRC) message indicating the additional set of uplink control channel resources; and receiving, from the UE, the uplink control information on the additional set of uplink control channel resources based at least in part on transmission of the RRC message.

* * * * *